United States Patent
Ashida et al.

(10) Patent No.: US 11,124,679 B2
(45) Date of Patent: Sep. 21, 2021

(54) LAMINATED SHEET AND METHOD FOR PRODUCING THE SAME

(71) Applicants: ZEON CORPORATION, Tokyo (JP); YUPO CORPORATION, Tokyo (JP)

(72) Inventors: Shinsuke Ashida, Tokyo (JP); Atsushi Sone, Tokyo (JP); Tamio Shikano, Matsudo (JP); Hiroshi Koike, Kamisu (JP)

(73) Assignees: ZEON CORPORATION, Tokyo (JP); YUPO CORPORATION, Tokyo (JP)

( * ) Notice: Subject to any disclaimer, the term of this patent is extended or adjusted under 35 U.S.C. 154(b) by 17 days.

(21) Appl. No.: 16/330,172

(22) PCT Filed: Sep. 12, 2017

(86) PCT No.: PCT/JP2017/032910
§ 371 (c)(1),
(2) Date: Mar. 4, 2019

(87) PCT Pub. No.: WO2018/051984
PCT Pub. Date: Mar. 22, 2018

(65) Prior Publication Data
US 2019/0185720 A1 Jun. 20, 2019

(30) Foreign Application Priority Data
Sep. 16, 2016 (JP) .............................. JP2016-181464

(51) Int. Cl.
*C09J 7/29* (2018.01)
*C08J 9/30* (2006.01)
(Continued)

(52) U.S. Cl.
CPC ................ *C09J 7/29* (2018.01); *B32B 5/32* (2013.01); *B32B 27/00* (2013.01); *B32B 27/08* (2013.01);
(Continued)

(58) Field of Classification Search
CPC ................ C09J 7/29; C09J 7/385; C09J 7/40
See application file for complete search history.

(56) References Cited

U.S. PATENT DOCUMENTS

2009/0288763 A1* 11/2009 Kiuchi .................... C09J 7/29
156/247
2011/0014410 A1* 1/2011 Hiroaki ................ C08F 220/18
428/41.8
(Continued)

FOREIGN PATENT DOCUMENTS

EP 3450518 A1 3/2019
JP H0858012 A 3/1996
(Continued)

OTHER PUBLICATIONS

Derwent Abstract of WO 2016/147680. See above foe date and inventor. (Year: 2016).*
(Continued)

*Primary Examiner* — Chinessa T. Golden
(74) *Attorney, Agent, or Firm* — Kenja IP Law PC

(57) ABSTRACT

Provided is a laminated sheet including an upper paper layer and a release sheet layer, the upper paper layer including synthetic paper and an adsorbing layer, the synthetic paper, the adsorbing layer and the release sheet layer, in order, being laminated, wherein the adsorbing layer is a foam sheet of a resin composition, the resin composition containing crosslinking resultant of 100 parts by mass of a (meth) acrylic acid ester copolymer resin and 1 to 20 parts by mass of a carbodiimide crosslinking agent, the (meth)acrylic acid ester copolymer resin having a N-methylol group, a glass transition temperature of the (meth)acrylic acid ester copolymer resin being no more than −10° C., the release sheet layer consists of a thermoplastic resin sheet, and a rate of tensile elastic moduli is 0.1 to 10, the rate being calculated from a tensile elastic modulus of the upper paper layer and
(Continued)

a tensile elastic modulus of the release sheet layer, and a peel strength of the adsorbing layer and the release sheet layer is 5 to 30 N/m, the laminated sheet using a new foamed resin layer having well-balanced properties, the amount of formaldehyde emitted from which is extremely small, as the adsorbing layer, the release sheet and the adsorbing layer having a proper release force.

5 Claims, 2 Drawing Sheets

(51) Int. Cl.
*G09F 3/10* (2006.01)
*B32B 27/30* (2006.01)
*B32B 27/00* (2006.01)
*B32B 5/32* (2006.01)
*C09J 7/40* (2018.01)
*C09J 7/38* (2018.01)
*B32B 27/08* (2006.01)
*B32B 27/32* (2006.01)
*C08J 9/36* (2006.01)

(52) U.S. Cl.
CPC .............. *B32B 27/30* (2013.01); *B32B 27/32* (2013.01); *C08J 9/30* (2013.01); *C08J 9/365* (2013.01); *C09J 7/385* (2018.01); *C09J 7/40* (2018.01); *C09J 7/401* (2018.01); *G09F 3/10* (2013.01); *B32B 2250/242* (2013.01); *B32B 2255/10* (2013.01); *B32B 2255/26* (2013.01); *C08J 2333/10* (2013.01); *C09J 2203/334* (2013.01); *C09J 2301/312* (2020.08); *C09J 2301/414* (2020.08); *C09J 2400/24* (2013.01); *C09J 2400/243* (2013.01); *C09J 2400/283* (2013.01); *C09J 2433/00* (2013.01); *C09J 2433/006* (2013.01)

(56) References Cited

U.S. PATENT DOCUMENTS

2014/0066557 A1* 3/2014 Koso ...................... C09J 133/14
524/166
2014/0158300 A1* 6/2014 Hayata ................... C09J 133/08
156/345.3
2018/0056625 A1   3/2018 Ashida et al.

FOREIGN PATENT DOCUMENTS

| JP | 2000177038 A | * | 6/2000 |
| JP | 2000177038 A |   | 6/2000 |
| JP | 2002221906 A |   | 8/2002 |
| JP | 2003001653 A |   | 1/2003 |
| JP | 2004174918 A | * | 6/2004 |
| JP | 2004174918 A |   | 6/2004 |
| JP | 2006176693 A |   | 7/2006 |
| JP | 2009276731 A |   | 11/2009 |
| WO | WO-2016147680 A1 | * | 9/2016 ................ C08J 9/04 |

OTHER PUBLICATIONS

Ueno, M. et al., Sheet and Recording Matter, Jun. 24, 2004, machine translation of JP2004-174918 (Year: 2004).*
Shindo, I., Suction Sheet and Its Applied Article, Jun. 27, 2000, machine translation of JP2000-177038 (Year: 2000).*
Mar. 19, 2019, International Preliminary Report on Patentability issued in the International Patent Application No. PCT/JP2017/032910.
Japanese Patent Application No. 2015-052998 filed on Mar. 17, 2015 in the name of Zeon Corporation which corresponds to US20180056625A1.
Dec. 12, 2017, International Search Report issued in the International Patent Application No. PCT/JP2017/032910.
Apr. 28, 2020, the Extended European Search Report issued by the European Patent Office in the corresponding European Patent Application No. 17850885.9.
Sep. 3, 2020, Office Action issued by the IP Australia in the corresponding Australian Patent Application No. 2017327140.
Dec. 21, 2020, Office Action issued by the IP Australia in the corresponding Australian Patent Application No. 2017327140.
Sep. 22, 2020, Office Action issued by the Intellectual Property India in the corresponding Indian Patent Application No. 201917008059.

* cited by examiner

Fig. 2

| | Production Example 1 | Production Example 2 | Production Example 3 | Production Example 4 | Production Example 5 | Production Example 6 | Production Example 7 |
|---|---|---|---|---|---|---|---|
| Resin material of each layer | (Printing face side) Resin composition F / Resin composition D / Resin composition C / Resin composition D / Resin composition D (Adsorbing layer side) | (Printing face side) Resin composition D / Resin composition B / Resin composition B (Adsorbing layer side) | (Printing face side) Resin composition C (Adsorbing layer side) | (Printing face side) Resin composition D / Resin composition A / Resin composition D (Adsorbing layer side) | (Printing face side) Resin composition E (Adsorbing layer side) | (Printing face side) Resin composition G / Resin composition G / Resin composition G (Adsorbing layer side) | (Printing face side) Resin composition H / Resin composition I / Resin composition H (Adsorbing layer side) |
| Thickness of each layer (μm) | 10 / 15 / 60 / 15 / 10 | 25 / 40 / 15 | 60 | 17 / 41 / 17 | 70 | 0.5 / 79 / 0.5 | 10 / 25 / 10 |
| Uniaxial or biaxial orientation of each layer | Uniaxial / Uniaxial / Biaxial / Uniaxial / Uniaxial | Uniaxial / Biaxial / Uniaxial | Biaxial | Uniaxial / Biaxial / Uniaxial | Biaxial | Biaxial / Biaxial / Biaxial | Biaxial / Biaxial / Biaxial |
| Total thickness (μm) | 110 | 80 | 60 | 75 | 70 | 80 | 45 |
| Whole porosity (%) | 31 | 25 | 33 | 7 | 48 | 44 | 16 |
| Opacity (%) | 96 | 89 | 83 | 40 | 83 | 72 | 85 |

LAMINATED SHEET AND METHOD FOR PRODUCING THE SAME

TECHNICAL FIELD

The present invention relates to a laminated sheet and a method for producing the same.

BACKGROUND ART

In recent years, for example, Patent Literature 1 disclosed a self-adsorbing sheet including a foamed resin layer having a plurality of microcavities as a stick sheet to be stuck to a smooth adherend such as window glass to be used, and products as disclosed have been utilized.

A mechanism for sticking of the self-adsorbing sheet owes much more to adsorption to an adherend utilizing microcavities as suction cups than wetting of an adherend by the foamed resin layer. Thus, remaining glue is little even if the self-adsorbing sheet is stuck and thereafter is peeled, and also the self-adsorbing sheet is easy to be restuck.

According to characteristics as described above, the self-adsorbing sheet may be preferably employed for various uses such as building decoration materials represented by interior decorative materials including wallpaper, and sticking materials for advertising including a poster, a sticker, etc. For the use therefor, generally, a base material such as a resin film is laminated to the self-adsorbing sheet, and is decorated by printing etc. For example, Patent Literature 1 discloses a film layer that contains a thermoplastic resin as a base material, has a porosity of 10 to 60%, and is excellent in offset printing properties, that is, synthetic paper.

Conventionally, a (meth)acrylic acid ester copolymer is preferably used as a base ingredient of the foamed resin layer composing the self-adsorbing sheet in view of various good mechanical strengths and good weatherability. Further, a (meth)acrylic acid ester copolymer having a N-methylol group is preferably used in view of enhancing strength under a humid environment.

On the other hand, a crosslinking agent is often used together in this foamed resin layer for the purpose of improving a cohesive force and enhancing various strengths. The inventors of the present invention found that when a melamine crosslinking agent is used as such a crosslinking agent, various strengths can be further enhanced.

However, it was found that when a (meth)acrylic acid ester copolymer having a N-methylol group, and a melamine crosslinking agent are used together, formaldehyde is emitted a lot as a by-product of the reaction in crosslinking.

As a technique of reducing the amount of formaldehyde emitted from the self-adsorbing sheet, for example, Patent Literature 2 discloses making a self-adsorbing sheet that does not generate at all or hardly generates formaldehyde, using a resin composition containing a (meth)acrylic acid ester copolymer having a carboxyl group, and an oxazoline crosslinking agent, for a foamed resin layer. However, in the invention of Patent Literature 2, the gel fraction of the (meth)acrylic acid ester copolymer has to be increased in order to obtain proper self-adsorption. In this case, smoothness of the foamed resin layer may be spoiled, and it is difficult to balance properties of a product.

As another technique of reducing the amount of formaldehyde emitted from the self-adsorbing sheet, the inventors of the present invention found that a self-adsorbing sheet that forms almost no formaldehyde, has proper self-adsorption, and is excellent in smoothness can be made by using a new resin composition containing a (meth)acrylic acid ester copolymer having a N-methylol group, and a carbodiimide crosslinking agent, for a foamed resin layer (description of Japanese Patent Application No. 2015-052998). However, in comparison with a case of using a melamine crosslinking agent, the self-adsorption (adsorbability) of this foamed resin layer increases, which results in hard removal from an adherend. When this foamed resin layer is used for a laminated sheet including a release sheet, the release sheet may be difficult to be peeled by hand.

CITATION LIST

Patent Literature

Patent Literature 1: JP 2004-174918 A
Patent Literature 2: JP 2006-176693 A

SUMMARY OF INVENTION

Technical Problem

An object of the present invention is to provide a laminated sheet which uses a new foamed resin layer having well-balanced properties, the amount of formaldehyde emitted from which is extremely small, as an adsorbing layer, and in which a release sheet and the adsorbing layer have a proper release force, and a method for producing the same.

Solution to Problem

As a result of deliberate research of the inventors in view of the problem as described above, they found that the problem can be solved by using a release sheet including a thermoplastic resin sheet, preferably a thermoplastic resin sheet having a specific formation and specific surface physical properties.

That is, the present invention includes the following aspects.

That is, a first aspect of the present invention is a laminated sheet comprising an upper paper layer and a release sheet layer, the upper paper layer including synthetic paper and an adsorbing layer, the synthetic paper, the adsorbing layer and the release sheet layer, in order, being laminated, wherein the adsorbing layer is a foam sheet of a resin composition, the resin composition containing crosslinking resultant of 100 parts by mass of a (meth)acrylic acid ester copolymer resin and 1 to 20 parts by mass of a carbodiimide crosslinking agent, the (meth)acrylic acid ester copolymer resin having a N-methylol group, a glass transition temperature of the (meth)acrylic acid ester copolymer resin being no more than −10° C., the release sheet layer consists of a thermoplastic resin sheet, and a rate of tensile elastic moduli is 0.1 to 10, the rate being calculated from a tensile elastic modulus of the upper paper layer and a tensile elastic modulus of the release sheet layer, the tensile elastic moduli being measured based on JIS K7161-1: 2014, and a peel strength of the adsorbing layer and the release sheet layer is 5 to 30 N/m, the peel strength being measured based on JIS K6854-2: 1999.

In this description, "(meth)acrylic" means "acrylic and/or methacrylic".

In the first aspect of the present invention, arithmetic mean roughness Ra of a surface of the release sheet layer is preferably 0.01 to 1 μm, the surface being in contact with the adsorbing layer, the arithmetic mean roughness Ra being specified in JIS B0601: 2001.

In the first aspect of the present invention, the release sheet layer preferably consists of a thermoplastic resin sheet whose surface is not treated with a release agent containing a silicone resin.

In the first aspect of the present invention, the synthetic paper is preferably a porous sheet containing a thermoplastic resin, a whole porosity of the porous sheet being 5 to 50%.

A second aspect of the present invention is a method for producing a laminated sheet that comprises, in order, synthetic paper, an adsorbing layer and a release sheet layer, the method comprising: preparing the synthetic paper; preparing the release sheet layer that contains a thermoplastic resin, arithmetic mean roughness Ra of at least one surface of the release sheet layer being 0.01 to 1 μm, the arithmetic mean roughness Ra being specified in JIS B0601: 2001; making a resin composition for the adsorbing layer, the resin composition containing 100 parts by mass of a (meth)acrylic acid ester copolymer resin, and 1 to 20 parts by mass of a carbodiimide crosslinking agent, the (meth)acrylic acid ester copolymer resin having a N-methylol group, a glass transition temperature of the (meth)acrylic acid ester copolymer resin being no more than −10° C.; foaming the resin composition for the adsorbing layer to obtain foam; shaping the foam into a sheet on the synthetic paper, thereafter crosslinking the (meth)acrylic acid ester copolymer resin to form the adsorbing layer, and thereby laminating the synthetic paper and the adsorbing layer; and laminating the release sheet layer onto the adsorbing layer so that a surface of the release sheet layer is in contact with the adsorbing layer, arithmetic mean roughness Ra of the surface being 0.01 to 1 μm.

In the second aspect of the present invention, the synthetic paper is preferably a porous sheet containing a thermoplastic resin, the porous sheet being a sheet that includes a porous layer whose whole porosity is 5 to 50%.

Advantageous Effects of Invention

The present invention makes it possible to provide a laminated sheet which uses a new foamed resin layer having well-balanced properties, the amount of formaldehyde emitted from which is extremely small, as an adsorbing layer, and in which a release sheet and the adsorbing layer have a proper release force, and a method for producing the same.

BRIEF DESCRIPTION OF DRAWINGS

FIG. 2 shows details of production examples made using raw materials shown in Table 1.

DESCRIPTION OF EMBODIMENTS

Figure 1:
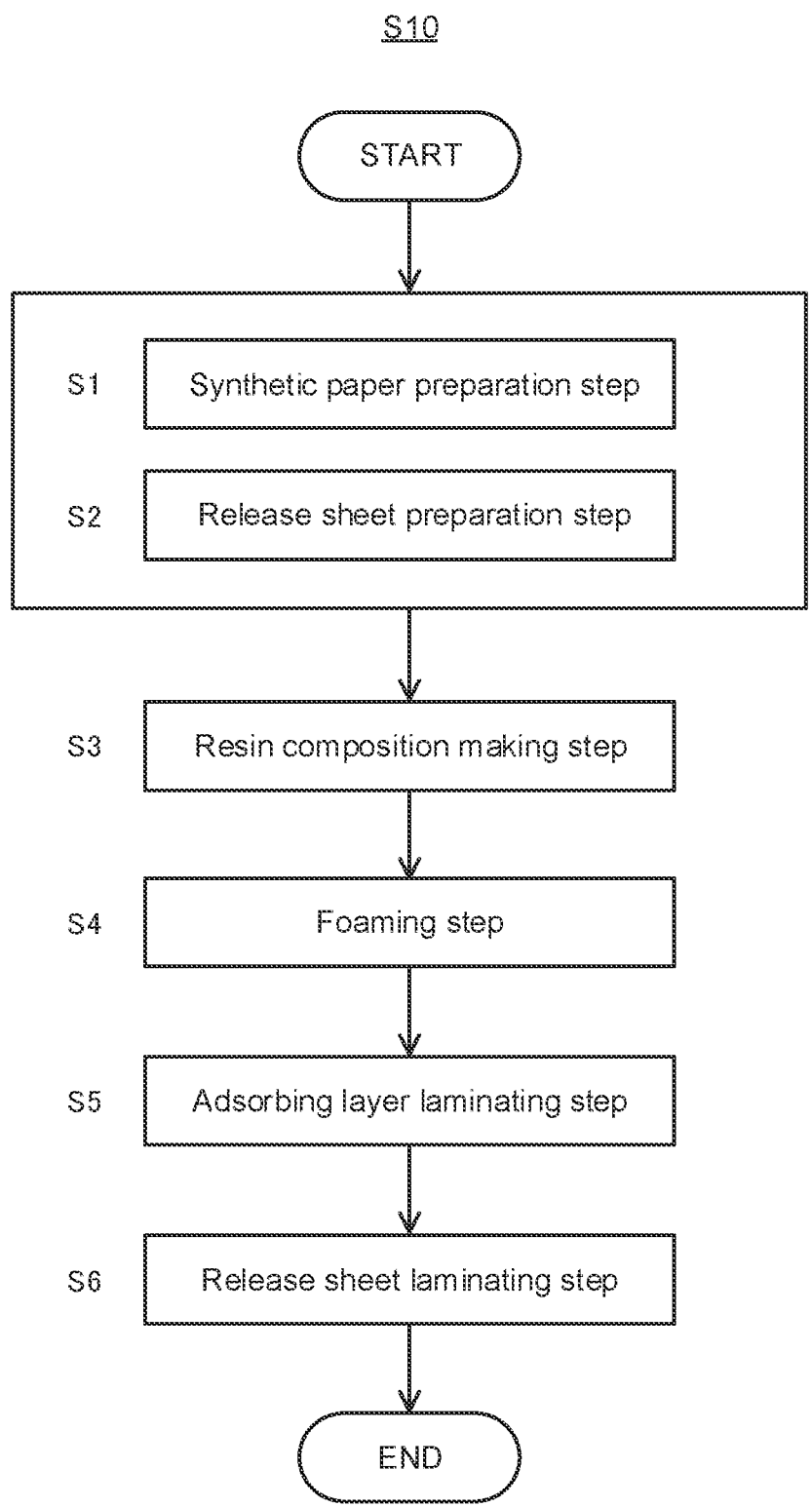
FIG. 1 is an explanatory flowchart of one embodiment of a method for producing a laminated sheet according to the present invention.

Hereinafter the embodiments of the present invention will be described. The embodiments described below are examples of the present invention, and the present invention is not limited thereto. In the present invention, "film" includes "sheet" and "sheet" includes "film". Expression "A to B" concerning numeral values A and B means "no less than A and no more than B" unless otherwise specified. If a unit is added only to the numeral value B in such expression, this unit is applied to the numeral value A as well.

1. Laminated Sheet

A laminated sheet of the present invention includes an upper paper layer and a release sheet layer, the upper paper layer including synthetic paper and an adsorbing layer, the synthetic paper, the adsorbing layer and the release sheet layer, in order, being laminated.

Hereinafter each layer included in the laminated sheet of the present invention will be described.

1.1. Upper Paper Layer

The upper paper layer included in the laminated sheet of the present invention includes the synthetic paper and the adsorbing layer.

1.1.1. Synthetic Paper

The synthetic paper used in the present invention is not specifically limited, and may be composed of a compound in the form of a film which contains a thermoplastic resin, and at least one of inorganic fine powder and an organic filler.

The synthetic paper is a porous sheet including a thermoplastic resin, and the whole porosity thereof is preferably 5 to 50%, and more preferably 15 to 45%. The whole porosity of no less than 5% makes it easy to improve opacity and flexibility of the synthetic paper. The whole porosity of no more than 50% makes it easy for the synthetic paper to have mechanical strengths, such as a tensile elastic modulus within proper ranges. "Whole porosity" in this description means a value obtained by cutting out a cross section of the film, and observing it by means of an electron microscope to measure the percentage of the area of pores to the whole observed area (%).

Examples of the thermoplastic resin include polyolefin resins such as polyethylene resins including low density polyethylene, linear low density polyethylene, middle density polyethylene and high density polyethylene, polypropylene resins, polymethyl-1-pentene and ethylene-cyclic olefin copolymers; polyamide resins such as nylon 6, nylon 6,6, and nylon 6,10; polyester resins such as polyethylene terephthalate and copolymers thereof, polyethylene naphthalate and aliphatic polyesters; polycarbonates, atactic polystyrene, syndiotactic polystyrene and polyphenylene sulfide. Two or more of them may be mixed to be used. Among them, polyolefin resins and polyester resins are preferable. Among polyolefin resins, polypropylene resins are preferable. Examples of polypropylene resins include propylene homopolymers, and copolymers of propylene, which is the main ingredient, and an α-olefin such as ethylene, 1-butene, 1-hexene, 1-heptene, and 4-methyl-1-pentene. The tacticity is not specifically limited. Isotactic or syndiotactic one, and one having a tacticity in any degree may be used. Any of binary, ternary and quaternary copolymers may be used, and any of random and block copolymers may be used.

Examples of the inorganic fine powder include calcium carbonate, calcined clay, silica, diatomaceous earth, talc, mica, synthetic mica, sericite, kaolinite, titanium oxide, barium sulfate and alumina. Among them, calcium carbonate and titanium oxide are preferable. One of them may be used alone, and two or more of them may be used in combination.

As the organic filler, a resin different from the thermoplastic resin, which is the above described main ingredient, is preferably selected. For example, when the thermoplastic resin, which is the above described main ingredient, is a polyolefin resin, examples of the organic filler include polyethylene terephthalate, polybutylene terephthalate, polycarbonates, nylon 6, nylon 6,6, cyclic olefin homopolymers, and copolymers of a cyclic olefin and ethylene, whose melting points are 120 to 300° C., or whose glass transition temperatures are 120 to 280° C. When the thermoplastic resin is a polyester resin, examples of the organic filler include polystyrene, polypropylene, polycarbonates, nylon 6, nylon 6,6, polymethyl-1-pentene, cyclic olefin homopolymers, and copolymers of a cyclic olefin and ethylene, whose melting points are 120 to 300° C., or whose glass transition temperatures are 120 to 280° C. One organic filler may be used alone, and two or more organic fillers may be used in combination.

The total content of the inorganic fine powder and the organic filler is preferably 8 to 65 wt %, and more preferably 10 to 60 wt %, in the synthetic paper. The total content within the range of 8 to 65 wt % makes it possible to balance whiteness with opacity of the synthetic paper itself.

The synthetic paper may be incorporated with other compounding agents such as an antioxidant, a light stabilizer, a dispersant and a lubricant if needed. Examples of an antioxidant include sterically-hindered phenol-type, phosphorus-containing, and amine-type antioxidants. Normally, the amount of incorporation thereof is approximately 0.001 to 1 wt % in the synthetic paper.

Examples of a light stabilizer include sterically-hindered amines, and benzotriazole-type and benzophenone-type light stabilizers. Normally, the amount of incorporation thereof is approximately 0.001 to 1 wt % in the synthetic paper.

Examples of a dispersant for the inorganic fine powder include silane coupling agents, higher fatty acids such as oleic acid and stearic acid, metal soaps, polyacrylic acid, polymethacrylic acid and salts thereof. Normally, the amount of incorporation thereof is approximately 0.01 to 4 wt % in the synthetic paper.

The synthetic paper may have either single-layer or multilayer structure. In the case of single-layer structure, the film may be any of a cast, uniaxially oriented, and biaxially oriented film. The multilayer structure may be two-layer, or at least three-layer structure. The two-layer structure may be any of cast/uniaxially oriented, cast/biaxially oriented, uniaxially oriented/uniaxially oriented, uniaxially oriented/biaxially oriented, and biaxially oriented/biaxially oriented structure. In the case of at least three-layer structure, single-layer structure and two-layer structure may be combined in any way as described above.

The whiteness of the synthetic paper is preferably no less than 80%, and more preferably no less than 85%. The whiteness of the synthetic paper itself of no less than 80% makes it much easier to distinguish the content printed and recorded on the laminated sheet of the present invention. "Whiteness" in this description means whiteness measured conforming to the method specified in JIS-L1015.

The synthetic paper can have proper opacity according to its use.

Specifically, the opacity of the synthetic paper is preferably 40 to 100%, more preferably 70 to 100%, and further preferably 80 to 100%. The opacity of no less than 40% leads to a sufficient concealing property as printing paper. "Opacity" in this description means opacity measured conforming to the method specified in JIS-P8138.

The thickness of the synthetic paper is preferably 20 to 900 μm, and more preferably 30 to 800 μm. The thickness of the synthetic paper itself of no less than 20 μm makes it possible to enhance mechanical strength of the whole of the laminated sheet of the present invention, and as a result, to form a poster or the like having a large area. The thickness of the synthetic paper itself of no more than 900 μm prevents the whole of the laminated sheet of the present invention from being too strong, and makes it possible to lighten the weight thereof to achieve prevention of a fall thereof in the use for sticking.

1.1.2. Adsorbing Layer

The adsorbing layer composing the laminated sheet of the present invention is a foam sheet of a resin composition containing crosslinking resultant of 100 parts by mass of a (meth)acrylic acid ester copolymer resin having a N-methylol group whose glass transition temperature is no more than −10° C., and 1 to 20 parts by mass of a carbodiimide crosslinking agent.

<(Meth)Acrylic Acid Ester Copolymer Resin>

Hereinafter, the (meth)acrylic acid ester copolymer resin used in the present invention will be described. The (meth)acrylic acid ester copolymer resin has a N-methylol group, and its glass transition temperature is no more than −10° C.

The glass transition temperature of the (meth)acrylic acid ester copolymer resin is no more than −10° C., and preferably no more than −13° C. The glass transition temperature of the (meth)acrylic acid ester copolymer resin of this upper limit or less makes it easy for the (meth)acrylic acid ester copolymer resin to have the gel fraction described below of a predetermined upper limit or less, and as a result, makes it easy to make the upper paper layer including the adsorbing layer having a proper self adsorption strength and excellent smoothness. While not specifically limited, the lower limit thereof is preferably no less than −40° C. In the present invention, "self adsorption strength" is peel strength between the adsorbing layer and an adherend.

The (meth)acrylic acid ester copolymer resin consists of no less than 50% by mass of monomeric units derived from a (meth)acrylic acid ester monomer and no more than 50% by mass of monomeric units derived from a monomer copolymerizable with the (meth)acrylic acid ester monomer, preferably consists of no less than 70% by mass of monomeric units derived from a (meth)acrylic acid ester monomer and no more than 30% by mass of monomeric units derived from a monomer copolymerizable with the (meth)acrylic acid ester monomer, more preferably consists of no less than 80% by mass of monomeric units derived from a (meth)acrylic acid ester monomer and no more than 20% by mass of monomeric units derived from a monomer copolymerizable with the (meth)acrylic acid ester monomer, and further preferably consists of no less than 85% by mass of monomeric units derived from a (meth)acrylic acid ester monomer and no more than 15% by mass of monomeric units derived from a monomer copolymerizable with the (meth)acrylic acid ester monomers. The content of monomeric units derived from a (meth)acrylic acid ester monomer within this range makes it possible to provide proper adhesion.

In the present invention, a N-methylol group that the (meth)acrylic acid ester copolymer resin has is included in a monomeric unit copolymerizable with the (meth)acrylic acid ester monomer, but may be included in a monomeric unit of a (meth)acrylic acid ester.

A (meth)acrylic acid ester monomer that can be used in the present invention is not limited, and a unit of a (meth)acrylic acid ester monomer composing a homopolymer whose glass transition temperature is no more than −20° C. is preferably included in view of easily having the glass transition temperature of the (meth)acrylic acid ester copolymer resin of no more than −10° C.

This (meth)acrylic acid ester monomer composing a homopolymer whose glass transition temperature is no more than −20° C. is not limited. Examples thereof include alkyl (meth)acrylic acid esters composing a homopolymer whose glass transition temperature is no more than −20° C. such as ethyl acrylate (glass transition temperature of the homopolymer is −24° C.), n-propyl acrylate (the same is −37° C.), n-butyl acrylate (the same is −54° C.), sec-butyl acrylate (the same is −22° C.), n-heptyl acrylate (the same is −60° C.), n-hexyl acrylate (the same is −61° C.), n-octyl acrylate (the same is −65° C.), 2-ethylhexyl acrylate (the same is −50° C.), n-octyl methacrylate (the same is −25° C.) and n-decyl methacrylate (the same is −49° C.); and alkoxyalkyl (meth) acrylic acid esters composing a homopolymer whose glass transition temperature is no more than −20° C. such as 2-methoxyethyl acrylate (the same is −50° C.), 3-methoxypropyl acrylate (the same is −75° C.), 3-methoxybutyl acrylate (the same is −56° C.) and ethoxymethyl acrylate (the same is −50° C.). Among them, alkyl (meth)acrylic acid esters composing a homopolymer whose glass transition temperature is no more than −20° C., and alkoxyalkyl (meth)acrylic acid esters composing a homopolymer whose glass transition temperature is no more than −20° C. are preferable, and alkyl (meth)acrylic acid esters composing a homopolymer whose glass transition temperature is no more than −20° C. are more preferable.

If the glass transition temperature of the (meth)acrylic acid ester copolymer resin can be adjusted to no more than −10° C., methyl acrylate (glass transition temperature of the homopolymer is 10° C.), methyl methacrylate (the same is 105° C.), ethyl methacrylate (the same is 63° C.), n-propyl methacrylate (the same is 25° C.), n-butyl methacrylate (the same is 20° C.) or the like may be used.

One (meth)acrylic acid ester monomer may be used alone, and two or more (meth)acrylic acid ester monomers may be used together.

It is necessary to use a monomer having a N-methylol group such as N-methylolacrylamide and N-methylolmethacrylamide as a monomer copolymerizable with a (meth) acrylic acid ester monomer (hereinafter referred to as "monomer for copolymerization"). Using a monomer having a N-methylol group makes it easy to have the gel fraction, which will be described later, of a predetermined upper limit or below, and as a result, makes it easy to make the upper paper layer including the adsorbing layer that has a proper self adsorption strength and excellent smoothness. In such a view, the percentage of using a monomer having a N-methylol group is such that monomeric units derived from the monomer having a N-methylol group are preferably 0.1% to 10% by mass, and more preferably 0.5% to 5% by mass when the (meth)acrylic acid ester copolymer resin is 100% by mass.

In addition to this monomer having a N-methylol group, another monomer may be used together as the monomer for copolymerization. A monomer used together other than a monomer having a N-methylol group is not limited as long as making it possible for the (meth)acrylic acid ester copolymer resin to have a glass transition temperature of no more than −10° C. Specific examples thereof include α,β-ethylenically unsaturated polyvalent carboxylic acid complete esters, alkenyl aromatic monomers, vinyl cyanide monomers, esters of carboxylic acids and unsaturated alcohols, olefinic monomers and other monomers having a functional group. Only one monomer may be used, and two or more monomers may be used together.

Specific examples of α,β-ethylenically unsaturated polyvalent carboxylic acid complete esters include dimethyl fumarate, diethyl fumarate, dimethyl maleate, diethyl maleate and dimethyl itaconate.

Specific examples of alkenyl aromatic monomers include styrene, α-methylstyrene, methyl α-methylstyrene and vinyltoluene.

Specific examples of vinyl cyanide monomers include acrylonitrile, methacrylonitrile, α-chloroacrylonitrile and α-ethylacrylonitrile.

Specific examples of monomers of esters of carboxylic acids and unsaturated alcohols include vinyl acetate.

Specific examples of olefinic monomers include ethylene, propylene, butene and pentene.

A monomer having a functional group may be used as the monomer for copolymerization for the purpose of efficient crosslinking inside or between copolymers.

Examples of a functional group here include organic acid groups, hydroxyl group, amino group, amide group, mercapto group and epoxy groups.

A monomer having an organic acid group is not specifically limited, and representative examples thereof include monomers having an organic acid group such as carboxyl group, acid anhydride group, and sulfonic acid group. In addition to them, a monomer composing sulfenic acid group, sulfinic acid group, or a phosphoric acid group may be used.

Specific examples of a monomer having carboxyl group include α,β-ethylenically unsaturated monocarboxylic acids such as acrylic acid, methacrylic acid and crotonic acid; α,β-ethylenically unsaturated polyvalent carboxylic acids such as itaconic acid, maleic acid and fumaric acid; and in addition, α,β-ethylenically unsaturated polyvalent carboxylic acid partial esters such as monomethyl itaconate, monobutyl maleate, and monopropyl fumarate. One having a group from which carboxyl group can be derived by hydrolysis or the like, such as maleic anhydride and itaconic anhydride may be used as well.

Specific examples of a monomer having sulfonic acid group include α,β-unsaturated sulfonic acids such as allylsulfonic acid, methallylsulfonic acid, vinylsulfonic acid, styrenesulfonic acid and acrylamido-2-methylpropane sulfonic acid; and salts thereof.

When a monomer having an organic acid group is used, such an amount of this monomer is used for polymerization that monomeric units derived from this monomer is preferably 0.1% to 20% by mass, and more preferably 0.5% to 15% by mass if the (meth)acrylic acid ester copolymer resin is 100% by mass. The amount of using a monomer having an organic acid group within this range makes it easy to keep viscosity of the polymerization system in polymerization within a proper range, and to prevent self-adsorption of the adsorbing layer from being spoiled due to excessive progress of crosslinking of copolymer.

A monomeric unit having an organic acid group is easy and preferable to be introduced into the (meth)acrylic acid ester copolymer resin by polymerization of a monomer having an organic acid group. An organic acid group may be introduced by a known polymer reaction after the (meth) acrylic acid ester copolymer resin is formed.

Examples of a monomer having hydroxyl group include hydroxyalkyl (meth)acrylic acid esters such as 2-hydroxyethyl (meth)acrylate, and 3-hydroxypropyl (meth)acrylate.

Examples of a monomer having amino group include N,N-dimethylaminomethyl (meth)acrylate, N,N-dimethylaminoethyl (meth)acrylate and aminostyrene.

Examples of a monomer having amide group include α,β-ethylenically unsaturated carboxylic acid amide monomers such as acrylamide, methacrylamide and N,N-dimethylacrylamide.

Examples of a monomer having an epoxy group include glycidyl(meth)acrylate and allyl glycidyl ether.

When such a monomer having a functional group other than any organic acid group is used, such an amount of this monomer is preferably used for polymerization that monomeric units derived from this monomer is no more than 10% by mass if the (meth)acrylic acid ester copolymer resin is 100% by mass. The amount of using a monomer having a functional group other than any organic acid group of no more than 10% by mass makes it easy to keep viscosity of the polymerization system in polymerization within a proper range, and to prevent self-adsorption of the adsorbing layer from being spoiled due to excessive progress of crosslinking of copolymer.

A polyfunctional monomer having a plurality of polymerizable unsaturated bonds may be used together as the monomer for copolymerization. A polymerizable unsaturated bond-terminated polyfunctional monomer is preferable. Using such a polyfunctional monomer makes it possible to introduce intramolecular and/or intermolecular crosslinking into the (meth)acrylic acid ester copolymer resin, to enhance a cohesive force.

Examples of a usable polyfunctional monomer include polyfunctional (meth)acrylates such as 1,6-hexanediol di(meth)acrylate, 1,2-ethylene glycol di(meth)acrylate, 1,12-dodecanediol di(meth)acrylate, polyethylene glycol di(meth)acrylate, polypropyleneglycol di(meth)acrylate, neopentylglycol di(meth)acrylate, pentaerythritol di(meth)acrylate, trimethylolpropane tri(meth)acrylate, pentaerythritol tri(meth)acrylate, ditrimethylolpropane tri(meth)acrylate, pentaerythritol tetra(meth)acrylate and dipentaerythritol hexa(meth)acrylate; substituted triazines such as 2,4-bis(trichloromethyl)-6-p-methoxystyrene-5-triazine; and in addition, mono-ethylenically unsaturated aromatic ketones such as 4-acryloxybenzophenone. Polyfunctional (meth)acrylates are preferable, and pentaerythritol di(meth)acrylate, pentaerythritol tri(meth)acrylate and pentaerythritol tetra(meth)acrylate are more preferable. One polyfunctional monomer may be used alone, and two or more polyfunctional monomers may be used together.

The (meth)acrylic acid ester copolymer resin can be obtained by copolymerizing a (meth)acrylic acid ester monomer and the monomer for copolymerization. A polymerization method when the (meth)acrylic acid ester copolymer resin is obtained is not specifically limited, and may be any of solution polymerization, emulsion polymerization, suspension polymerization and bulk polymerization, and may be a method other than them. A polymerization initiator, an emulsifying agent, a dispersing agent and the like which are used for polymerization, and their amounts are not specifically limited as well. A method of adding a monomer, a polymerization initiator, an emulsifying agent, a dispersing agent and the like upon polymerization is not specifically limited as well. Also, there is no limitation on polymerization temperature, pressure, stirring conditions and the like.

The (meth)acrylic acid ester copolymer resin may be in the form of either a solid or dispersion. If the (meth)acrylic acid ester copolymer resin obtained from emulsion polymerization or dispersion polymerization as an emulsion or dispersion is used as it is, operation is easy in mixing with the crosslinking agent and a conductive compound, and it is convenient to foam the obtained emulsion or dispersion as well.

The gel fraction of the (meth)acrylic acid ester copolymer resin is preferably no more than 70%, and more preferably no more than 65%. The gel fraction within this range makes it easy to make the upper paper layer including the adsorbing layer that has a proper self adsorption strength and excellent smoothness.

The gel fraction in the present invention is a value obtained from the following formula by immersing 500 mg of a sample of the acrylic acid ester copolymer resin in 100 ml of ethyl acetate at an ambient temperature for 3 days, thereafter filtering the insoluble content through woven metal of 200 meshes, air-drying the filtered content at an ambient temperature for 15 hours, thereafter drying this content at 100° C. for 2 hours, and measuring a dry mass of the dried insoluble content.

Gel fraction (% by mass)=((dry mass of insoluble content after immersion in ethyl acetate)/(mass of sample before immersion in ethyl acetate))×100

<Carbodiimide Crosslinking Agent>

The carbodiimide crosslinking agent used in the present invention is not specifically restricted as long as being a compound having a carbodiimide group. A compound having two or more carbodiimide groups in one molecule thereof is preferably used. A known carbodiimide compound may be used as such a compound.

Either a known carbodiimide compound described above may be synthesized, or a commercially available carbodiimide compound may be used. Examples of a commercially available carbodiimide compound include "DICNAL FIX" manufactured by DIC Corporation, and "CARBODILITE" manufactured by Nisshinbo Chemical Inc. When a carbodiimide compound is synthesized, for example, a polycarbodiimide compound that is a carbodiimidized polyisocyanate by a decarboxylative condensation reaction in the presence of a carbodiimidization catalyst may be used.

Examples of a raw material polyisocyanate include hexamethylene diisocyanate (HDI), hydrogenated xylylene diisocyanate (H6XDI), xylylene diisocyanate (XDI), 2,2,4-trimethylhexamethylene diisocyanate (TMHDI), 1,12-diisocyanatedecane (DDI), norbornane diisocyanate (NBDI), 2,4-bis-(8-isocyanateoctyl)-1,3-dioctylcyclobutane (OCDI), 4,4'-dicyclohexylmethane diisocyanate (HMDI), tetramethylxylylene diisocyanate (TMXDI), isophorone diisocyanate (IPDI), 2,4,6-triisopropylphenyldiisocyanate (TIDI), 4,4'-diphenylmethane diisocyanate (MDI), tolylene diisocyanate (TDI) and hydrogenated tolylene diisocyanate (HTDI). A carbodiimide compound can be synthesized by stirring and mixing a polyisocyanate at a temperature within the range of 0 to 200° C. for any length of time in the presence of an air flow or bubbling of an inert gas, thereafter adding a carbodiimidization catalyst, and stirring and mixing them.

Here, a carbodiimidization catalyst described above is preferably an organophosphorus compound, and especially preferably a phospholene oxide in view of activity. Specific examples thereof include 3-methyl-1-phenyl-2-phospholene-1-oxide, 3-methyl-1-ethyl-2-phospholene-1-oxide, 1,3-dimethyl-2-phospholene-1-oxide, 1-ethyl-2-phospholene-1-oxide, 1-methyl-2-phospholene-1-oxide and double bond isomers thereof.

The carbodiimide crosslinking agent forms intramolecular or intermolecular crosslinking structure of the (meth)acrylic acid ester copolymer due to a reaction of a carbodiimide group thereof with a N-methylol group in the (meth)acrylic acid ester copolymer resin. The carbodiimide crosslinking agent is preferable because having an excellent crosslinking effect especially at low temperature, which makes it possible to form the adsorbing layer excellent in strength and self-adsorption.

Both the carbodiimide crosslinking agent and a crosslinking agent other than the carbodiimide crosslinking agent (such as epoxy resins including poly(ethylene glycol) diglycidyl ether, glycerin polyglycidyl ether, sorbitol polyglycidyl ether and bisphenol A polyglycidyl ether; aziridine compounds including ethylenimine derivatives such as aldehyde and acrolein; multifunctional isocyanate crosslinking agents including tolylene diisocyanate, trimethylolpropane tolylene diisocyanate and diphenylmethane triisocyanate;

oxazoline crosslinking agents; metal salt-based crosslinking agents; metal chelate-based crosslinking agents; and peroxide-based crosslinking agents) may be used together. Preferably, crosslinking agents that cause emission of formaldehyde, such as aldehyde resins including melamine-formaldehyde resins, urea-formaldehyde resins and phenolformaldehyde resins are not used.

The amount of using the carbodiimide crosslinking agent is 1 to 20 parts by mass, preferably 2 to 15 parts by mass, and more preferably 2.5 to 10 parts by mass, as a solid, to 100 parts by mass of the (meth)acrylic acid ester copolymer resin. The amount of using the carbodiimide crosslinking agent within this range makes it possible to have a proper self adsorption strength, and to enhance strength of the resin after crosslinking.

A foam sheet of a resin composition containing crosslinking resultant of 100 parts by mass of the (meth)acrylic acid ester copolymer resin having a N-methylol group whose glass transition temperature is no more than −10° C., and 1 to 20 parts by mass of the carbodiimide crosslinking agent can be formed by a resin composition making step S3 to an adsorbing layer laminating step S5 described later, which a method for producing a laminate of the present invention includes.

(Other Additives)

The resin composition (resin composition for the adsorbing layer) containing 100 parts by mass of the (meth)acrylic acid ester copolymer resin having a N-methylol group whose glass transition temperature is no more than −10° C., and 1 to 20 parts by mass of the carbodiimide crosslinking agent make it possible to make the amount of emission of formaldehyde extremely small without containing any formaldehyde scavenger. However, this resin composition may further contain a formaldehyde scavenger.

A formaldehyde scavenger that may be used in the present invention is not specifically limited as long as being a compound that may physically adsorb, or chemically react with formaldehyde. This formaldehyde scavenger may be either an inorganic compound or an organic compound that includes even polymers.

Specific examples of a formaldehyde scavenger include nitrogen-containing compounds such as: hydroxylamine sulfate, hydroxylamine hydrochloride, ammonium acetate, urea, ethyleneurea, dicyandiamide, polyamide resins, triazine compounds and hydrazide compounds; halogen oxides such as stabilized chlorine dioxide; and metallic salts such as disodium hydrogen phosphate, zinc sulfate, calcium chloride and magnesium sulfate. Among them, nitrogen-containing compounds are preferable and hydroxylamine sulfate is especially preferable in view of easy availability, operability and capture of formaldehyde.

One formaldehyde scavenger may be used individually, and two or more formaldehyde scavengers may be used.

The resin composition for the adsorbing layer may contain various additives if necessary in order to improve processability in producing steps, and properties of the adsorbing layer to be obtained.

Examples of additives include foam stabilizers, auxiliary blowing agents, thickeners, fillers, antiseptics, fungicides, gelatinizers, flame retardants, anti-aging agents, antioxidants, pigments, dyes, tackifiers and conductive compounds.

Examples of a usable foam stabilizer include ammonium salts of fatty acids such as ammonium stearate, sulfonic acid-type anionic surfactants such as alkyl sulfosuccinate, quaternary alkylammonium chloride, amphoteric compounds of alkyl betaines, and alkanolamine salts of fatty acids.

Examples of a usable auxiliary blowing agent include sodium lauryl sulfate, sodium alkyl diphenyl ether disulphonate and sodium polyoxyethylene alkylphenol ether sulfate.

Examples of a usable thickener include acrylic polymer particles, inorganic compound particulates such as fine silica particles, and reactive inorganic compounds such as magnesium oxide.

Examples of a usable filler include calcium carbonate, magnesium carbonate, aluminum hydroxide, magnesium hydroxide, barium hydroxide, clay, kaolin, and glass powder.

Examples of a usable antiseptic and fungicide include dihydroxy dichlorophenylmethane, sodium pentachlorophenate, 2,3,4,6-tetrachloro-4-(methylsulfonyl)pyridine, 2,3,5,6-tetrachloro-4-(methylsulfonyl)pyridine, bis(tributyltin) oxide, hexahydro-1,3,5-triethyl-s-triazine, silver complexes and zinc complexes.

Examples of a usable gelatinizer include ammonium salts such as ammonium acetate, ammonium chloride and ammonium carbonate, alkylphenol alkylene oxide addition products, polyvinylmethyl ether, polypropylene glycol, polyether polyformal, methylcellulose, hydroxyethyl cellulose and silicone heat sensitizers.

Examples of a usable flame retardant include phosphoric acid ester compounds, halogen phosphoric acid ester compounds, ammonium polyphosphate, antimony trioxide, zinc borate, barium metaborate, ammonium hydroxide, magnesium hydroxide, tin compounds, organophosphorous compounds, red phosphorus compounds, and silicone flame retardants.

Examples of a usable antioxidant include polyphenol-based, hydroquinone-based and hindered amine-based antioxidants.

Examples of pigments and dyes include titanium oxide, carbon black, iron oxide red and quinacridone.

As a tackifier, any compound selected from the following may be used: a rosin resin such as gum rosins, tall oil rosins, wood rosins, hydrogenated rosins, disproportionated rosins, polymerized rosins, maleated rosins, rosin glycerol esters and hydrogenated rosin glycerol esters; a terpene based resin such as terpene resins, terpene phenol resins and aromatic modified terpene resins; a petroleum resin such as aliphatic petroleum resins, alicyclic petroleum resins and aromatic petroleum resins; a coumarone-indene resin; a terpene phenol-based resin; a phenol resin; a hydrogenated rosin ester; a disproportionated rosin ester; and a xylene resin.

1.2. Release Sheet Layer

The release sheet layer that composes the laminated sheet of the present invention is to be laminated onto the adsorbing layer in order to prevent the upper paper layer from adsorbing anything other than the adherend to be aimed. Thus, the release sheet layer is laminated onto the upper paper layer to protect the upper paper layer until the upper paper layer is used. When the upper paper layer is used, the release sheet layer is separated from the upper paper layer, and is usually discarded. Therefore, the release sheet layer is desired not to peel easily when the laminated sheet is transported, and in secondary processing such as printing, and to be peeled easily by hand when the upper paper layer is used.

In such a view, in the laminated sheet of the present invention, it is important that the peel strength of the bonded adsorbing layer and release sheet layer which is measured based on JIS K6854-2: 1999 is 5 to 30 N/m. The peel strength is preferably 5 to 20 N/m, further preferably 5 to 15 N/m, and especially preferably 5 to 12 N/m. The peel strength of no less than 5 N/m does not allow the upper paper layer and the release sheet layer to easily loose to be separated in secondary processing such as printing on the laminated sheet. The peel strength of no more than 30 N/m makes it possible for them to be easily separated by hand.

A release sheet layer is desired to have release force (equal to peel strength) as described above for a specific adsorbing layer composing the laminated sheet of the present invention. However, a desired peel strength is not always obtained by simply using a conventionally known release sheet.

For example, when a release sheet layer of a paper base coated with a silicone release agent was used, almost no adsorbability of the upper paper layer (adsorbing layer) was exerted, and the release sheet layer easily peeled. Thus, it was found that release paper of a paper base which is generally used for a release sheet is not preferable for the release sheet layer composing the laminated sheet of the present invention. This was believed to be because effect of adsorption due to suction cups is hard to be obtained from the adsorbing layer since a surface of a paper base has great roughness derived from pulp fiber. Therefore, in the present invention, a sheet formed of a thermoplastic resin that makes it easy to obtain a smoother surface is used as the release sheet layer.

When a thermoplastic resin sheet of a polyethylene terephthalate resin film, a surface of which was not treated with a release agent such as silicone, was used as the release sheet layer, adsorbability of the upper paper layer (adsorbing layer) increased so that the release sheet layer was not easily peeled by hand perhaps because a chemical affinity (wettability) with the adsorbing layer increased. However, when a polyethylene terephthalate resin film that was coated with a silicone release agent was used, the release sheet layer easily peeped like the case of using a paper base.

Thus, it was considered to use a polyethylene resin film or a polypropylene resin film, a surface of which was not treated with a release agent such as silicone, as the release sheet layer. In this case, it was found that while adsorbability of the release sheet layer and the upper paper layer (adsorbing layer) can have a proper value, too light removal leads to easy peeling as well as the case of using one coated with a silicone release agent, when surface roughness (unevenness) on a release sheet layer side is great.

It was found from trial and error as described above that as the release sheet layer composing the laminated sheet of the present invention which can achieve a desired peel strength, a sheet formed of a thermoplastic resin, a surface of which is not treated with a release agent containing a silicone resin etc., is preferable, a sheet formed of a nonpolar polyolefin resin such as a polyethylene resin and a polypropylene resin is preferable, and a sheet whose surface that is a laminating face is relatively smooth is preferable.

As a result of further trial and error, it was found that when the release sheet layer whose surface roughness is preferably within the range of 0.01 to 1 μm, more preferably within the range of 0.02 to 0.5 μm, and further preferably within the range of 0.03 to 0.3 μm in terms of the arithmetic mean roughness Ra specified by JIS B0601: 2001 is used, the release sheet layer that can achieve a desired peel strength is easy to be obtained.

On the other hand, one factor for the release sheet layer composing the laminated sheet of the present invention not to easily peel in secondary processing on the laminated sheet such as printing is its easy/hard elongation for tensile strength.

In order to make the upper paper layer and the release sheet layer which compose the laminated sheet of the present invention hard to elongate, their tensile elastic moduli are each preferably 100 to 5000 MPa, and more preferably 200 to 4000 MPa.

Printing is carried out on the synthetic paper, which makes it possible to use the laminated sheet of the present invention in a manner of a label, a POP, or the like. A label printing press is widely spread as a printing press for label printing.

Such a label printing press is to unwind a long sheet for printing in the form of a web to carry out printing on the unwound sheet, and then to punch out the sheet in the form of a label or to rewind the sheet. The laminated sheet is pinched and rubbed by a plurality of rolls according to a type of a printing press (for example, a rotary relief printing press) etc., and may be elongated by a very high tension according to conditions of the print speed etc. Therefore, when there is a large difference in tensile elastic modulus between the upper paper layer and the release sheet layer which compose the laminated sheet of the present invention, their different elongation causes them to loose to be separated, and as a result such a problem arises that a shear in multicolor printing is generated.

Examples of measures to solve such a problem include a method of matching their hard elongation for tensile stress to each other. Specifically, the rate of the tensile elastic moduli of the upper paper layer composing the laminated sheet and the release sheet layer which are measured based on JIS K7161-1: 2014 is within the range of 0.1 to 10. The rate of the tensile elastic moduli is preferably within the range of 0.2 to 5, and further preferably within the range of 0.3 to 3. This range makes it hard to loose to be separated in the laminated sheet because of elongation of one layer.

As a specific measure to match the tensile elastic moduli of the upper paper layer and the release sheet layer that compose the laminated sheet to each other, in the present invention, the synthetic paper containing a thermoplastic resin is used for a base material of the upper paper layer, and a sheet formed of a thermoplastic resin is also used for the release sheet layer. In view of matching their tensile elastic moduli to each other as much as possible, a thermoplastic resin used for the synthetic paper is preferably the same as that used for the release sheet layer if possible.

As described above, the release sheet layer is preferably a sheet formed of a thermoplastic resin, a surface of which is not treated with a release agent containing a silicone resin etc., and is preferably a sheet formed of a nonpolar polyolefin resin such as a polyethylene resin and a polypropylene resin, and is preferably a sheet, surface roughness of a surface of which that is a laminating face is 0.01 to 1 μm in terms of the arithmetic mean roughness Ra specified by JIS B0601: 2001.

Examples of such a sheet formed of a thermoplastic resin include a CPE (cast polyethylene) film, an OPE (oriented polyethylene) film, a CPP (cast polypropylene) film and an OPP (oriented polypropylene) film.

The thickness of the release sheet layer is preferably 10 to 100 μm, more preferably 20 to 80 μm, and further preferably 30 to 60 The thickness of the release sheet layer within this range makes it easy to suppress elongation of either one of them, in cooperation with the thickness of the synthetic paper.

2 Method for Producing Laminated Sheet

Hereinafter a method for producing the laminated sheet of the present invention will be described.

FIG. 1 is an explanatory flowchart of a method for producing the laminated sheet of the present invention S10 (hereinafter may be abbreviated as "this producing method S10"). As shown in FIG. 1, this producing method S10 includes, in order, a synthetic paper preparation step S1, a release sheet preparation step S2, a resin composition making step S3, a foaming step S4, an adsorbing layer laminating step S5 and a release sheet laminating step S6. The order of the synthetic paper preparation step S1 and the release sheet preparation step S2 may be backward. The synthetic paper preparation step S1 and the release sheet preparation step S2 may be performed at the same time. Hereinafter each step will be described.

(Synthetic Paper Preparation Step S1)

The synthetic paper preparation step S1 is a step of preparing the synthetic paper. The synthetic paper prepared in this step may be a commercially available one, and may be made of a compound in the form of a film which contains a thermoplastic resin and at least one of inorganic fine powder and an organic filler which are materials of the synthetic paper.

An ordinary shaping method is used as a method of shaping a compound containing a thermoplastic resin and at least one of inorganic fine powder and an organic filler into a film. Examples thereof include casting of extruding a molten resin in the form of a film using a single-layer or multilayer T die or I die that is connected to a screw extruder, uniaxially expanding of longitudinally expanding a cast film made by casting utilizing difference in circumferential speed of rolls, biaxially expanding of further transversely expanding a uniaxially oriented film utilizing a tenter oven, simultaneous biaxially expanding by combination of a tenter oven and a linear motor, and inflation of extruding a molten resin into the form of a tube using a ring die, and expanding the resin by compressed air in a biaxial direction.

The expanding temperature in expanding is preferably: a temperature lower than the melting point of a thermoplastic resin to be used by 2 to 60° C., that is, approximately 152 to 164° C. when the resin is a propylene homopolymer (melting point: 155 to 167° C.) and approximately 110 to 120° C. when the resin is a high density polyethylene (melting point: 121 to 134° C.); a temperature lower by no less than 10° C. than the melting point of a resin which is used at approximately 70 to 120° C., and lower than the glass transition temperature of the resin plus 50° C. when the resin is polyethylene terephthalate (melting point: 246 to 260° C.). The expanding speed is preferably 20 to 350 m/min.

When the synthetic paper has at least two-layer structure, a laminating method therefor may be a known method such as co-extrusion, melt extrusion lamination and combination thereof.

(Release Sheet Preparation Step S2)

The release sheet preparation step S2 is a step of preparing a release sheet layer that contains a thermoplastic resin, arithmetic mean roughness Ra of at least one surface of the release sheet layer being 0.01 to 1 µm, the arithmetic mean roughness Ra being specified in JIS B0601: 2001. The release sheet prepared in this step may be a commercially available one. A cast or oriented sheet may be made as the release sheet.

A cast sheet can be made by melting and kneading a thermoplastic resin used for a raw material by means of an extruder during heating, extruding and molding the resin into the form of a sheet, and thereafter cooling the resin. An oriented sheet can be made by expanding a cast sheet in a uniaxial or biaxial direction.

As a specific method of giving the release sheet layer surface roughness as described above, this surface roughness can be achieved by using cooling rolls which are used in cooling after extrusion molding, and whose surfaces are processed to have the roughness to be aimed, or by adjusting the cooling temperature to slowly or rapidly cool an extruded and molded sheet.

(Resin Composition Making Step S3)

The resin composition making step S3 is a step of making the resin composition for the adsorbing layer containing 100 parts by mass of the (meth)acrylic acid ester copolymer resin having a N-methylol group whose glass transition temperature is no more than −10° C., and 1 to 20 parts by mass of the carbodiimide crosslinking agent.

In the resin composition making step S3, the resin composition for the adsorbing layer can be made by mixing: the (meth)acrylic acid ester copolymer resin having a N-methylol group whose glass transition temperature is no more than −10° C., and the carbodiimide crosslinking agent, which are essential ingredients; and other ingredients used if desired according to any method. Each substance used in this step, the proportion of using each substance, etc. are as described above, and thus the description thereof is omitted here.

When being an emulsion or dispersion, the (meth)acrylic acid ester copolymer resin can be easily mixed only by adding thereto the carbodiimide crosslinking agent and the other ingredients in a state of an aqueous dispersion, an aqueous solution, or the like while stirred.

When the (meth)acrylic acid ester copolymer resin is in the form of a solid, a mixing method thereof is not specifically restricted as well. For example, mixing may be carried out with rolls, a Henschel mixer, a kneader, or the like. Either batch mixing or continuous mixing may be carried out.

Examples of a batch mixer include a kneader and a stirrer for high viscosity raw materials such as a mortar machine, a kneader, an internal mixer and a planetary mixer. Examples of a continuous mixer include a Farrel continuous mixer etc. that are combination of rotors and screws, and a kneader of special structure like a screw kneader. A single-screw extruder and a twin-screw extruder that are used for extrusion are also included. Two or more types of extruders and kneaders may be combined, and a plurality of machines of the same type may be coupled to be used.

A form of the resin composition for the adsorbing layer of the present invention is not specifically limited, and the form of an emulsion or a dispersion is convenient to obtain the adsorbing layer.

The viscosity of this emulsion or dispersion is preferably 2000 to 10000 mPa·s, and more preferably 3500 to 5500 mPa·s.

(Foaming Step S4)

The foaming step S4 is a step of foaming the resin composition for the adsorbing layer, to obtain foam.

In the foaming step S4, the resin composition for the adsorbing layer made in the resin composition making step S3 is foamed, which makes it possible to obtain foam in an unsolidified state. When the resin composition for the adsorbing layer is in the form of an emulsion or dispersion, a foamed emulsion or foamed dispersion is obtained.

Generally, mechanical foaming is employed for a foaming method. The foaming magnification may be properly adjusted, is normally 1.2 to 5, and is preferably 1.5 to 4. A method of mechanical foaming is not specifically restricted, and can be carried out by mixing a certain volume of air with an emulsion of the resin composition, and stirring the mixture with a continuous or batch type Oakes mixer, whipper, or the like. A foamed emulsion obtained according to this way is creamy.

Instead of mechanical foaming as described above, the foaming resin composition can be also prepared with, for example, a method of using a proper synthetic resin such as a vinylidene chloride copolymer as a shell wall to add a thermally expandable microcapsule that encompasses a hydrocarbon compound of a low boiling point to an acrylic resin emulsion or a butadiene synthetic rubber emulsion.

(Adsorbing Layer Laminating Step S5)

The adsorbing layer laminating step S5 is a step of shaping the foam into a sheet on the synthetic paper, and thereafter crosslinking the (meth)acrylic acid ester copolymer resin to form the adsorbing layer, and thereby laminating the synthetic paper and the adsorbing layer.

In the adsorbing layer laminating step S5, a method of shaping the foam into a sheet is not specifically restricted. Preferred examples thereof include a method of coating the synthetic paper with the foam, to shape the foam into a sheet.

Such a generally known coating device can be used for a method of coating the synthetic paper with the foam as a roll coater, a reverse roll coater, a screen coater, a doctor knife coater and a comma knife coater. Specifically, uniform coating thickness can be obtained using a doctor knife coater.

The adsorbing layer that is solidification of the sheet foam can be formed over the synthetic paper by shaping the foam into a sheet on the synthetic paper as described above, and thereafter crosslinking the (meth)acrylic acid ester copolymer resin.

In the adsorbing layer laminating step S5, preferably heating drying is carried out when the (meth)acrylic acid ester copolymer resin is crosslinked. A method of heating drying is not specifically restricted as long as the foamed emulsion with which the synthetic paper is coated can be dried and crosslinked. An ordinary oven with hot air circulation, hot air chamber with a hot oil circulator, far infrared ray heater chamber, etc. can be used for this method. The drying temperature is properly 60° C. to 180° C. The drying conditions can be properly selected according to the properties, the coating amount, the coating thickness, etc. of the emulsion. Preferably, not drying at fixed temperature but multi-stage drying is carried out in such a way that drying is carried out from the inside at lower temperature at the early stage to the entire at higher temperature at the later stage.

The density, thickness, hardness, etc. of the obtained adsorbing layer are adjusted according to the mixing ratio of air bubbles, the formation of the resin composition for the adsorbing layer, the solid concentration, conditions of solidification by heating drying, etc. The thickness of the adsorbing layer is preferably 0.03 to 3 mm, more preferably 0.05 to 1 mm, and especially preferably 0.05 to 0.5 mm. If the thickness is thinner than 0.03 mm, the impact absorbency is poor, and retention of an item, and the function of protecting a surface of an item are insufficient when the upper paper layer is used as an item retention material or an item surface protection material. If the thickness is thicker than 3 mm, the strength of the adsorbing layer is poor, which is not preferable as well. The density of the adsorbing layer is not specifically restricted, and is preferably 0.1 to 1.0 g/cm$^3$ in view of impact absorbency.

(Release Sheet Laminating Step S6)

The release sheet laminating step S6 is a step of laminating the release sheet layer onto the adsorbing layer so that a surface of the release sheet layer is in contact with the adsorbing layer, arithmetic mean roughness Ra of the surface being 0.01 to 1 μm. Specifically, after the adsorbing layer that is shaped into a sheet by coating is heated and dried in the adsorbing layer laminating step S5, a long release sheet is unwound and laminated so that the above-identified face of the release sheet is in contact with the adsorbing layer on the synthetic paper, and next the release sheet and the adsorbing layer are stuck by pinching via pressure rollers, which makes it possible to obtain the laminated sheet.

The laminated sheet obtained by the release sheet laminating step S6 is usually wound by a winder, and cut by press cutting, with a slitter, etc., to be processed to have a usable size.

3. Use

Examples of printing that is able to be carried out on the synthetic paper of the upper paper layer of the present invention include offset printing, label printing, flexographic printing, silk screening, gravure printing and printing with a laser printer, a thermal transfer printer, an ink jet printer, and the like.

The upper paper layer on the synthetic paper of which printing is carried out may be used as a building decoration material, a sticking material for advertising, or material for stationery or toys. Examples of uses thereof include a card for sales promotion, what is called a POP card (such as a poster, a sticker and a display), an underlay (such as a place mat, a table mat and a pencil board), a menu for fast food restaurants serving hamburgers, sushi, yakisoba etc., a catalogue, a panel, a plate (substitution for a metal plate), a bromide, a price list for in-shop display, an information board (such as store, direction and destination directory, for sweets and groceries, etc.), a POP for gardening (such as a plant label), a road sign (for funerals, housing display parks, etc.), a display board (displaying "keep out", operation on forestry roads, or the like), a calendar (with images), a simple whiteboard, a mouse pad, a coaster, a printed matter that is a substitution for that made with a label printer, and an adhesive label.

Since excellent in releasability, the upper paper layer that is obtained by separating the release sheet layer from the laminated sheet of the present invention does not partially remain on an article to be stuck after removal thereof. Therefore, the upper paper layer may be preferably used as an item surface protection material or an item retention material that is directed to various optical components, precision components, etc.

The laminated sheet of the present invention emits almost no formaldehyde even if emitting it. The amount of emission of formaldehyde can be even smaller than the detection limit (for example, smaller than 0.1 ppm) by proper setting of the formation of the resin composition for the adsorbing layer. Thus, the laminated sheet of the present invention is preferably employed for places and uses where emission of formaldehyde is inhibited or not preferable. That is, the upper paper layer that is obtained by separating the release sheet layer from the laminated sheet of the present invention is preferably used as a building interior decoration material, or a material for stationery or toys.

EXAMPLES

The present invention will be described in more detail in Examples below. The present invention is not restricted to Examples. "Parts" and "%" used below will be by mass unless otherwise specified.

Production Examples of Synthetic Paper

Synthetic paper shown in FIG. 2 was made using raw materials shown in Table 1 according to the following Production Examples.

Production Example of Synthetic Paper 1

A resin composition C consisting of 65% of a propylene homopolymer (NOVATEC-PP MA3), 10% of a high density polyethylene (NOVATEC-HD HJ360) and 25% of ground calcium carbonate fine powder was molten and kneaded by means of an extruder at 250° C., thereafter was supplied to a die that was set at 250° C. to be extruded in the form of a sheet, and was cooled by means of cooling rolls to 60° C., to be a cast sheet. The obtained cast sheet was heated to 135° C., and was expanded in a longitudinal direction (MD direction) at 4 magnifications, to be a base material layer. Next, a resin composition D consisting of 50% of a propylene homopolymer (NOVATEC-PP MA3), 5% of a high density polyethylene (NOVATEC-HD HJ360) and 45% of ground calcium carbonate fine powder, and a resin composition F consisting of 40% of a propylene homopolymer (NOVATEC-PP MA3), 5% of a cyclic olefin copolymer and 55% of ground calcium carbonate fine powder were molten and kneaded by means of two extruders at 250° C. respectively, thereafter were supplied to a coextrusion die that was set at 250° C. to be extruded in the form of a sheet and laminated onto one face of the base material layer so that the resin composition F was an outer layer. Next, the resin composition D consisting of 50% of a propylene homopolymer (NOVATEC-PP MA3), 5% of a high density polyethylene (NOVATEC-HD HJ360) and 45% of ground calcium carbonate fine powder was molten and kneaded by means of two extruders at 250° C., thereafter supplied to a coextrusion die that was set at 250° C. to be extruded in the form of a sheet, laminated onto the other face of the base material layer, and then cooled to 60° C., which led to obtainment of a laminated sheet of five-layer structure (F/D/C/D/D). Next, the obtained laminated sheet of five-layer structure was reheated to 150° C., was expanded in a transversal direction (TD direction) at 8.5 magnifications, and was annealed at 160° C. to be cooled to 60° C. Next, an edge of the sheet was slit, and synthetic paper of Production Example 1 which was composed of a multilayer resin oriented sheet was obtained.

The total thickness of the obtained synthetic paper was 110 μm (thickness of each layer: F/D/C/D/D=10 μm/15 μm/60 μm/15 μm/10 μm), the whole porosity thereof was 31%, and opacity thereof was 96%, all of which were measured by methods described later.

Production Example of Synthetic Paper 2

A resin composition B consisting of 75% of a propylene homopolymer (NOVATEC-PP MA3), 10% of a high density polyethylene (NOVATEC-HD HJ360) and 15% of ground calcium carbonate fine powder was molten and kneaded by means of an extruder at 250° C., thereafter was supplied to a die that was set at 250° C. to be extruded in the form of a sheet, and was cooled by means of cooling rolls to 60° C., to be a cast sheet. The obtained cast sheet was heated to 135° C., and was expanded in a longitudinal direction (MD direction) at 4 magnifications, to be a base material layer. Next, the resin composition D consisting of 50% of a propylene homopolymer (NOVATEC-PP MA3), 5% of a high density polyethylene (NOVATEC-HD HJ360) and 45% of ground calcium carbonate fine powder was molten and kneaded by means of an extruder at 250° C., thereafter was supplied to an extrusion die that was set at 250° C. to be extruded in the form of a sheet, and was laminated onto one face of the base material layer. Next, the resin composition B consisting of 75% of a propylene homopolymer (NOVATEC-PP MA3), 10% of a high density polyethylene (NOVATEC-HD HJ360) and 15% of ground calcium carbonate fine powder was molten and kneaded by means of an extruder at 250° C., thereafter was supplied to an extrusion die that was set at 250° C. to be extruded in the form of a sheet, was laminated onto the other face of the base material layer, and then was cooled to 60° C., which led to obtainment of a laminated sheet of three-layer structure (D/B/B). Next, the obtained laminated sheet of three-layer structure was reheated to 150° C., was expanded in a transversal direction (TD direction) at 8.5 magnifications, and was annealed at 160° C. to be cooled to 60° C. Next, an edge of the sheet was slit, and synthetic paper of Production Example 2 which was composed of a multilayer resin oriented sheet was obtained.

The total thickness of the obtained synthetic paper was 80 μm (thickness of each layer: D/B/B=25 μm/40 μm/15 μm), the whole porosity thereof was 25% and opacity thereof was 89%, all of which were measured by methods described later.

Production Example of Synthetic Paper 3

The resin composition C consisting of 65% of a propylene homopolymer (NOVATEC-PP MA3), 10% of a high density polyethylene (NOVATEC-HD HJ360) and 25% of ground calcium carbonate fine powder was molten and kneaded by means of an extruder at 250° C., thereafter was supplied to a die that was set at 250° C. to be extruded in the form of a sheet, and was cooled by means of cooling rolls to 60° C., to be a cast sheet. The obtained cast sheet was heated to 135° C., and was expanded in a longitudinal direction (MD direction) at 4 magnifications, to be a base material layer. Next, the obtained base material layer was reheated to 150° C., was expanded in a transversal direction (TD direction) at 8.5 magnifications, and was annealed at 160° C. to be cooled to 60° C. Next, an edge of the sheet was slit, and synthetic paper of Production Example 3 which was composed of a single-layer resin oriented sheet was obtained.

The total thickness of the obtained synthetic paper was 60 μm, the whole porosity thereof was 33% and opacity thereof was 83%, all of which were measured by methods described later.

Production Example of Synthetic Paper 4

A resin composition A consisting of 85% of a propylene homopolymer (NOVATEC-PP MA3), 10% of a high density polyethylene (NOVATEC-HD HJ360) and 5% of ground calcium carbonate fine powder was molten and kneaded by means of an extruder at 250° C., thereafter was supplied to a die that was set at 250° C. to be extruded in the form of a sheet, and was cooled by means of cooling rolls to 60° C., to be a cast sheet. The obtained cast sheet was heated to 145° C., and was expanded in a longitudinal direction (MD direction) at 4 magnifications, to be a base material layer. Next, the resin composition D consisting of 50% of a propylene homopolymer (NOVATEC-PP MA3), 5% of a high density polyethylene (NOVATEC-HD HJ360) and 45% of ground calcium carbonate fine powder was molten and kneaded by means of an extruder at 250° C., thereafter was supplied to an extrusion die that was set at 250° C. to be extruded in the form of a sheet, and was laminated onto one face of the base material layer. Next, the resin composition D consisting of 50% of a propylene homopolymer (NOVATEC-PP MA3), 5% of a high density polyethylene (NOVATEC-HD HJ360) and 45% of ground calcium carbonate fine powder was molten and kneaded by means of an extruder at 250° C., thereafter was supplied to an extrusion die that was set at 250° C. to be extruded in the form of a sheet, was laminated onto the other face of the base material layer, and then was cooled to 60° C., which led to obtainment of a laminated sheet of three-layer structure (D/A/D). Next, the obtained laminated sheet of three-layer structure was reheated to 160° C., was expanded in a transversal direction (TD direction) at 8.5 magnifications, and was annealed at 164° C. to be cooled to 60° C. Next, an edge of the sheet was slit, and synthetic paper of Production Example 4 which was composed of a multilayer resin oriented sheet was obtained.

The total thickness of the obtained synthetic paper was 75 μm (thickness of each layer: D/A/D=17 μm/41 μm/17 μm), the whole porosity thereof was 7% and opacity thereof was 40%, all of which were measured by methods described later.

Production Example of Synthetic Paper 5

A resin composition E consisting of 54% of a propylene homopolymer (NOVATEC-PP MA3), 1% of a high density polyethylene (NOVATEC-HD HJ360) and 45% of precipitated calcium carbonate fine powder was molten and kneaded by means of an extruder at 250° C., thereafter was supplied to a die that was set at 250° C. to be extruded in the form of a sheet, and was cooled by means of cooling rolls to 60° C., to be a cast sheet. The obtained cast sheet was heated to 142° C., and was expanded in a longitudinal direction (MD direction) at 5 magnifications, to be a base material layer. Next, the obtained base material layer was reheated to 150° C., was expanded in a transversal direction (TD direction) at 8 magnifications, and was annealed at 160° C. to be cooled to 60° C. Next, an edge of the sheet was slit, and synthetic paper of Production Example 5 which was composed of a single-layer resin oriented sheet was obtained.

The total thickness of the obtained synthetic paper was 70 μm, the whole porosity thereof was 48% and opacity thereof was 83%, all of which were measured by methods described later.

Production Example of Synthetic Paper 6

A resin composition G consisting of 30% of a high density polyethylene (NOVATEC-HD HB338RE) and 70% of ground calcium carbonate fine powder was molten and kneaded by means of an extruder at 200° C., thereafter was extruded in the form of a strand, and was cut with a cutter to make pellets. Next, the pellets were introduced into three extruders that were set at 210° C., supplied to a coextrusion die that was set at 210° C. to be laminated in the die, extruded in the form of a sheet, and cooled to 60° C. by means of cooling rolls, which led to obtainment of a cast laminated sheet of three-layer structure (G/G/G). Next, the obtained cast laminated sheet was heated to 97° C. using a simultaneous biaxially expanding tester, and was expanded in both longitudinal and transversal directions at 2.1 magnifications. Next, an edge of the sheet was cut, and synthetic paper of Production Example 6 which was composed of a multilayer resin oriented sheet was obtained.

The total thickness of the obtained synthetic paper was 80 μm (thickness of each layer: G/G/G=0.5 μm/79 μm/0.5 μm), the whole porosity thereof was 44% and opacity thereof was 72%, all of which were measured by methods described later.

Production Example of Synthetic Paper 7

A resin composition I consisting of 85% of polyethylene terephthalate, 2% of a styrene homopolymer and 13% of a propylene homopolymer (NOVATEC-PP FY6), and a resin composition H consisting of 98% of polyethylene terephthalate and 2% of titanium oxide fine powder were molten and kneaded by means of three extruders at 280° C., thereafter were supplied to a coextrusion die that was set at 280° C. to be laminated in the die, extruded in the form of a sheet, and rapidly cooled to 30° C. by means of cooling rolls, to be a cast laminated sheet of three-layer structure (H/I/H). The obtained cast sheet was heated to 85° C. using a longitudinal expanding machine composed of a plurality of groups of rolls, and was expanded in a longitudinal direction (MD direction) at 3.4 magnifications, to be a longitudinal oriented sheet. Next, the obtained longitudinal oriented sheet was reheated to 130° C. using a tenter, thereafter was cooled by cool air, was expanded in a transversal direction (TD direction) at 75° C. at 3.7 magnifications, and was annealed at 85° C. Next, an edge of the sheet was slit, and synthetic paper of Production Example 7 which was composed of a multilayer resin oriented sheet was obtained.

The total thickness of the obtained synthetic paper was 45 μm (thickness of each layer: H/I/H=10 μm/25 μm/10 nm), the whole porosity thereof was 16% and opacity thereof was 85%, all of which were measured by methods described later.

TABLE 1

| | Resin composition A | Resin composition B | Resin composition C | Resin composition D | Resin composition E | Resin composition F | Resin composition G | Resin composition H | Resin composition I |
|---|---|---|---|---|---|---|---|---|---|
| Propylene homopolymer (Trade name: NOVATEC-PP MA3 by Japan Polypropylene Corp.) | 85 | 75 | 65 | 50 | 54 | 40 | — | — | — |
| Propylene homopolymer (Trade name: NOVATEC-PP FY6 by Japan Polypropylene Corp.) | — | — | — | — | — | — | — | — | 13 |
| High density polyethylene (Trade name: NOVATEC-HD HJ360 by Japan Polyethylene Corp.) | 10 | 10 | 10 | 5 | 1 | — | — | — | — |
| High density polyethylene (Trade name: NOVATEC-HD HB338RE by Japan Polyethylene Corp.) | — | — | — | — | — | — | 30 | — | — |

TABLE 1-continued

| | Resin composition A | Resin composition B | Resin composition C | Resin composition D | Resin composition E | Resin composition F | Resin composition G | Resin composition H | Resin composition I |
|---|---|---|---|---|---|---|---|---|---|
| Cyclic olefin copolymer (Trade name: APEL 6011T by Mitsui Chemicals, Inc.) | — | — | — | — | — | 5 | — | — | — |
| Polyethylene terephthalate (Trade name: NOVAPEX G5 by Mitsubishi Chemical Corp.) | — | — | — | — | — | — | — | 98 | 85 |
| Polystyrene (Trade name: PSJ-Polystyrene SGP10 by PS Japan Corp.) | — | — | — | — | — | — | — | — | 2 |
| Ground calcium carbonate fine powder (Trade name: SOFTON 1800 by Bihoku Funka Kogyo Co., Ltd.) | 5 | 15 | 25 | 45 | — | 55 | 70 | — | — |
| Precipitated calcium carbonate fine powder (Trade name: KALFAIN YM23 by Maruo Calcium Co., Ltd.) | — | — | — | — | 45 | — | — | — | — |
| Titanium oxide fine powder (Trade name: TA-300 by Fuji Titanium Industry Co., Ltd.) | — | — | — | — | — | — | — | 2 | — |

Production Examples of Release Sheet

Release sheets shown in Table 2 were made according to the following Production Examples. Or, films consisting of commercially available thermoplastic resins or commercially available release paper shown in Table 2 were used as release sheets.

Production Example of Release Sheet 8

A propylene homopolymer (brand name: NOVATEC-PP FB3B manufactured by Japan Polypropylene Corporation) was molten and kneaded by means of an extruder at 250° C., thereafter was supplied to a die that was set at 250° C., and was extruded in the form of a sheet. The sheet was pinched by a metallic roll that was plated with hard chromium on one face thereof and a silicon rubber roll on the other face thereof, to be cooled to 60° C., to be a release sheet composed of a cast polypropylene film that was referred to as CPP in the Examples. The thickness of the obtained release sheet was 50 μm, the arithmetic mean roughness Ra on a gloss face side thereof was 0.21 μm and the arithmetic mean roughness Ra on a mat face side thereof was 1.4 μm, all of which were measured by methods described later.

Production Example of Release Sheet 9

A high density polyethylene (brand name: NOVATEC-HD LF443 manufactured by Japan Polyethylene Corporation) was molten and kneaded by means of an extruder at 200° C., thereafter was supplied to a die that was set at 210° C., and was extruded in the form of a sheet. The sheet was pinched by a metallic roll that was plated with hard chromium on one face thereof and a silicon rubber roll on the other face thereof, to be cooled to 60° C., to be a release sheet composed of a cast polyethylene film that was referred to as CPE in the Examples. The thickness of the obtained release sheet was 30 μm, the arithmetic mean roughness Ra on a gloss face side thereof was 0.11 μm and the arithmetic mean roughness Ra on a mat face side thereof was 1.25 μm, all of which were measured by methods described later.

TABLE 2

| | | Arithmetic mean roughness Ra (μm) | |
|---|---|---|---|
| Abbr. | Content | Gloss face | Mat face |
| CPP | Cast polypropylene film of 50 μm in thickness, including one gloss face and other mat face, prepared in Production Ex. 8 | 0.21 | 1.4 |
| CPE | Cast polyethylene film of 30 μm in thickness, including one gloss face and other mat face, prepared in Production Ex. 9 | 0.11 | 1.25 |
| OPP | Commercially available biaxially oriented polypropylene film (Trade name: TAIKO FOS#60 by Futamura Chemical Co., Ltd., gloss faces on both sides) | 0.04 | — |
| PET1 | Commercially available biaxially oriented polyethylene terephthalate film (Trade name: Lumirror S10#50 by Toray Industries, Inc., gloss faces on both sides) | 0.05 | — |
| PET2 | Commercially available biaxially oriented polyethylene terephthalate film (Trade name: DIAFOIL MRA#50 by Mitsubishi Chemical Corp.) | 0.06 (Silicone-treated face) | 0.06 |
| Paper separator | Release sheet made from commercially available double faced polyethylene laminated fine paper (Trade name: MW11 by Oji Tac Co., Ltd.) | 0.22 (Silicone-treated face) | 1.1 |

Preparation Examples of Resin Composition for Adsorbing Layer

Resin compositions for adsorbing layers were made using raw materials shown in Table 3 according to the following Preparation Examples.

Preparation Example of Resin Composition 1

Into a mixing vessel, in terms of the solid content, 100 parts of a N-methylol group-containing (meth)acrylic acid ester copolymer resin 1-containing aqueous dispersion (solid content: 55%), 3.6 parts of a carbodiimide crosslinking agent and 4.2 parts of a pigment were added and stirred with a high speed disperser. Next, while continued to be stirred, in terms of the solid content, 2 parts of a thickener, 2.2 parts of a foam stabilizer 1 and 1.9 parts of a foam stabilizer 2, in order, were added and uniformly mixed, and thereafter were filtered through a stainless sieve of 150 meshes. Lastly, ammonia was added to adjust the viscosity to 4500 mPa·s, and a resin composition for an adsorbing layer J was obtained.

Preparation Example of Resin Composition 2

A resin composition for an adsorbing layer K was obtained in the same manner as in Preparation Example of the resin composition 1 except that a N-methylol group-containing (meth)acrylic acid ester copolymer resin 2 was used instead of the N-methylol group-containing (meth)acrylic acid ester copolymer resin 1 as used in Preparation Example of the resin composition 1.

Preparation Example of Resin Composition 3

A resin composition for an adsorbing layer L was obtained in the same manner as in Preparation Example of the resin composition 1 except that, the content of incorporating the carbodiimide crosslinking agent was changed from 3.6 parts as used in Preparation Example of the resin composition 1 to 6.5 parts in terms of the solid content.

Preparation Example of Resin Composition 4

A resin composition for an adsorbing layer M was obtained in the same manner as in Preparation Example of the resin composition 1 except that a melamine crosslinking agent and a crosslinking promoter were used instead of the carbodiimide crosslinking agent as used in Preparation Example of the resin composition 1, and that the content of incorporating each raw material was changed as shown in Table 3.

TABLE 3

|  | Resin composition J | Resin composition K | Resin composition L | Resin composition M |
| --- | --- | --- | --- | --- |
| N-methylol group-containing (meth)acrylic acid ester copolymer resin 1 (Formation: copolymer resin of ethyl acrylate 46.9 wt %/butyl acrylate 45.8 wt %/acrylonitrile 5.9 wt %/N-methylolacrylamido 1.4 wt %, glass transition temp.: −25.9° C., gel fraction: 43.1%) | 100 | — | 100 | 100 |
| N-methylol group-containing (meth)acrylic acid ester copolymer resin 2 (Copolymer resin obtained by reducing the contents of ethyl acrylate and butyl acrylate from those in above formation, and adding ethyl methacrylate instead, to prepare to have glass transition temp. of −10.1° C. and gel fraction of 42.2%) | — | 100 | — | — |
| Carbodiimide crosslinking agent (Trade name: DICNAL HX by DIC Corp.) | 3.6 | 3.6 | 6.5 | — |

TABLE 3-continued

|  | Resin composition J | Resin composition K | Resin composition L | Resin composition M |
| --- | --- | --- | --- | --- |
| Melamine crosslinking agent (Trade name: BECKAMINE M3 by DIC Corp.) | — | — | — | 7.3 |
| Crosslinking promoter (Trade name: CATALYST ACX by DIC Corp.) | — | — | — | 0.3 |
| Pigment/titanium dioxide aqueous dispersion (Trade name: DISPERSE WHITE HG-701 by DIC Corp.) | 4.2 | 4.2 | 4.2 | 4.2 |
| Thickener/carboxylic acid-modified ester acrylate polymer (Trade name: Aron B-300K by TOAGOSEI CO., LTD) | 2.0 | 2.0 | 2.0 | 1.6 |
| Foam stabilizer 1/mixture of amphoteric compound of alkyl betaine and alkanolamid salt of fatty acid (Trade name: DICNAL M-20 by DIC Corp.) | 2.2 | 2.2 | 2.2 | 2.2 |
| Foam stabilizer 2/sulfonic acid-type anionic surfactant (Trade name: DICNAL M-40 by DIC Corp.) | 1.9 | 1.9 | 1.9 | 1.9 |

(Unit: parts by mass)

Making Laminated Sheet

Example 1

The resin composition for an adsorbing layer J that was obtained in Preparation Example of the resin composition 1 was stirred by means of a beater as air was blown thereinto to generate micro air bubbles, and was whipped so that the foaming magnification was 2. Further, stirring was continued for 5 minutes at a lower stirring speed.

Next, the resin composition J in which micro air bubbles were generated was applied onto all over one face of the synthetic paper obtained in Production Example of the synthetic paper 1 using an applicator so that the thickness was 300 µm, and then was put in a drying oven and kept at 80° C. for 1.33 minutes, at 120° C. for 1.33 minutes and at 140° C. for 1.33 minutes, to be dry-crosslinked, and an upper paper layer that was made by laminating an adsorbing layer onto the synthetic paper was obtained.

Next, the CPP obtained in Production Example of the release sheet 8 was laminated onto the adsorbing layer of the upper paper layer so that the gloss face side thereof was in contact with the adsorbing layer, next was contact-bonded at a load of 2 kg using a manual bonding roller at 23° C. in temperature at 50% in relative humidity, and further was left to stand still at 23° C. in temperature at 50% in relative humidity for 24 hours, to promote crosslinking, and a laminated sheet of Example 1 was obtained.

Table 4 summarizes the thickness of each layer of the obtained laminated sheet, the measured tensile elastic modulus of each of the upper paper layer and the release sheet, the rate of the tensile elastic moduli calculated from the tensile elastic moduli, the measured peel strength and the evaluation results of the presence or not of loosing separation during printing, manual releasability and the amount of dissipating formaldehyde.

Examples 2 to 13 and Comparative Examples 1 to 11

The laminated sheets of Examples 2 to 13 and Comparative Examples 1 to 11 were obtained in the same manner as in Example 1 except that the synthetic paper, the resin composition for an adsorbing layer, the release sheet and the laminating face of the release sheet used in Example 1 were changed to the combination shown in Table 4, and further a gap of the applicator was adjusted so that the thickness of the adsorbing layer was as shown in Table 4.

Table 4 summarizes the thickness of each layer of the obtained laminated sheet, the measured tensile elastic modulus of each of the upper paper layer and the release sheet, the rate of the tensile elastic moduli calculated from the tensile elastic moduli, the measured peel strength and the evaluation results of the presence or not of loosing separation during printing, manual releasability and the amount of dissipating formaldehyde.

Evaluation Items

Glass Transition Temperature (Tg) of (Meth)Acrylic Acid Ester Copolymer Resin

The glass transition temperature (Tg) of the (meth)acrylic acid ester copolymer resin that was used as a raw material of the adsorbing layer was measured by the following method.

That is, a (meth)acrylic acid ester copolymer resin-containing aqueous dispersion was applied onto the PET 1 film shown in Table 2 using an applicator so that the thickness was 250 μm, and was dried at 23° C. in temperature at 50% in relative humidity for 24 hours. The coating film was peeled, and a film of this resin was obtained.

Next, this film, as a sample, was subjected to heat flux differential scanning calorimetry (heat flux DSC) by means of a differential scanning calorimeter (name of device: DSC6220 manufactured by SII NanoTechnology Inc.) at −50° C. to 160° C. in measurement temperature at 10° C./min in heating rate, conforming to JIS K 7121: 1987, and the glass transition temperature (midpoint glass transition temperature ($T_{mg}$)) (° C.) was measured.

Gel Fraction of (Meth)Acrylic Acid Ester Copolymer Resin

The gel fraction of the (meth)acrylic acid ester copolymer resin used as a raw material of the adsorbing layer was measured by the following method.

That is, a (meth)acrylic acid ester copolymer resin-containing aqueous dispersion was applied onto the PET 1 film shown in Table 2 using an applicator so that the thickness was 250 μm, and was dried at 23° C. in temperature at 50% in relative humidity for 24 hours. The coating film was peeled, and a film of this resin was obtained.

Next, a certain amount (approximately 500 mg) of this film, as a sample, was precisely weighed, and the mass corresponding thereto was recorded as X. The resultant was immersed in 100 ml of ethyl acetate at 23° C. for 3 days, and thereafter the insoluble content was filtered through a stainless sieve of 200 meshes. The filtered resultant was air-dried at 23° C. for 15 hours, thereafter was dried at 100° C. for 2 hours, and was cooled to 23° C. Thereafter the mass of the sample was measured, and was recorded as Y. The gel fraction of the (meth)acrylic acid ester copolymer resin was calculated by substitution of the measured masses X and Y in the following formula 1.

$$\text{Gel Fraction (\%)} = Y/X \times 100 \quad (1)$$

Arithmetic mean roughness Ra

The arithmetic mean roughness Ra of a surface of the release sheet layer was measured conforming to the specification of JIS B0601: 2001 by means of surface roughness instrument (trade name: SE-3AK manufactured by Kosaka Laboratory Ltd.) and an analyzer (trade name: SPA-11 manufactured by Kosaka Laboratory Ltd.). The arithmetic mean roughness Ra of a surface of the release sheet layer which was in contact with the adsorbing layer was preferably 0.01 to 1 μm, more preferably 0.02 to 0.5 μm, and further preferably 0.03 to 0.3 μm. The arithmetic mean roughness Ra of no less than 0.01 μm did not make removal of the release sheet and the adsorbing layer in the laminated sheet too difficult. The arithmetic mean roughness Ra of no more than 1 μm did not make removal of the release sheet and the adsorbing layer in the laminated sheet too easy.

Thickness

The total thickness of the upper paper layer, the synthetic paper, and the release sheet layer which composed the laminated sheet was measured conforming to the method specified in JIS-P8118 using a thickness measuring device (manufactured by Haiburitti-Seisakujyo). The thickness of the adsorbing layer was obtained from the difference between the upper paper layer and the synthetic paper used for this upper paper layer in thickness.

A cross section of each layer was observed using an electron microscope in porosity observation described below, and the interfaces between the layers were determined from an external appearance, and the proportion of thickness was obtained. From the total thickness and the proportion of thickness of each layer obtained above, the thickness of each layer when the synthetic paper had multilayer structure was calculated.

Whole Porosity

The porosity in the synthetic paper was a value obtained by: observing a cross section of the synthetic paper by means of a scanning electron microscope, taking an observed image into an image analyzer, and carrying out image analysis on the observed area to calculate the proportion of the area of pores on the cross section. Specifically, a sample for observation on a cross section was made from the synthetic paper by means of a focused ion beam using gallium so that pores did not crush. A cross section of the obtained sample was observed at a proper magnification using a scanning electron microscope (manufactured by JEOL Ltd., trade name: JSM-6490) or the like. The proportion of the area of pores or the like to the cross section of the sheet (proportion of the area) was calculated from an observed area of an obtained picture of the cross section using an image analyzer (manufactured by Nireco Corporation, trade name: LUZEX AP) or the like. The calculated proportion could be recorded as a porosity. The whole porosity was a mean value of the porosity when observation was carried out on all over the area in the thickness direction of the synthetic paper.

The whole porosity in the synthetic paper was preferably 5 to 50%, and more preferably 15 to 45%. The whole porosity of no less than 5% made it easy to improve opacity and flexibility of the synthetic paper. The whole porosity of no more than 50% made it easy to make mechanical strength of the synthetic paper such as a tensile elastic modulus within a proper range.

Opacity

The opacity in the synthetic paper was a value showing the ratio of reflectivity of light of a measured sample which was measured in the cases where a black and a white standard board were applied to the rear face of the measured sample (black board/white board) in terms of percentage based on the method specified in JIS-P-8138.

The synthetic paper might have a proper opacity according to its use. Specifically, the opacity of the synthetic paper was preferably 40 to 100%, more preferably 70 to 100%, and further preferably 80 to 100%. The opacity of no less than 40% led to obtainment of a concealing property enough for printing paper.

Tensile Elastic Modulus

The tensile elastic moduli of the upper paper layer and the release sheet in the laminated sheet were values measured using a tension tester based on JIS K7161-1: 2014.

The rate of the tensile elastic moduli which was calculated by dividing a value of the measured tensile elastic modulus of the upper paper layer by that of the release sheet was 0.1 to 10, preferably 0.2 to 5, and further preferably 0.3 to 3. The rate of the tensile elastic moduli within this range did not allow the upper paper layer and the release sheet layer to easily loose to be separated in secondary processing such as printing on the laminated sheet.

Peel Strength

The peel strength of the bonded adsorbing layer and release sheet in the laminated sheet was obtained as a mean peel strength obtained when the upper paper layer and the release sheet were subjected to 180° peeling using a tensile tester based on JIS K6854-2: 1999. When they were easily separated and was not able to measure the peel strength substantially, a value thereof was recorded as 0 N/m.

The peel strength of the bonded adsorbing layer and release sheet in the laminated sheet was 5 to 30 N/m, preferably 5 to 15 N/m, and further preferably 5 to 10 N/m. The peel strength of no less than 5 N/m did not allow the upper paper layer and the release sheet layer to easily loose to be separated in secondary processing such as printing on the laminated sheet. The peel strength of no more than 30 N/m made it possible to easily separate them by hand.

Evaluation Items

Presence or not of Loosing Separation During Printing

Presence or not of loosing separation of the upper paper layer and the release sheet layer when multicolor printing was carried out on the laminated sheet obtained in each of Examples and Comparative Examples using a semi-rotary label press was evaluated as follows. Specifically, printing of texture information, ruled lines, and a design of full four colors was carried out on the synthetic paper of the laminated sheet using a semi-rotary label press (name of device: LPM-300iT manufactured by LINTEC Corporation) and UV cure-type inks (trade name: UV-161 Black, Cyan, Magenta and Yellow manufactured by T&K TOKA CO., LTD.) at 100 m/min in print speed, the inks were dried and solidified by ultraviolet ray irradiation, and thereafter the laminated sheet was wound. Presence or not of loosing separation was evaluated in view of the state of the laminated sheet during the printing, and the state of a printed matter after the printing by the following criteria.

none: stable printing where no shear was confirmed in the four-color design.

present: it was confirmed that the upper paper layer and the release sheet layer loosed during the printing, and a shear in colors was confirmed in the design.

Manual Releasability

The laminated sheet obtained in each of Examples and Comparative Examples was cut out into a size of A4, and releasability of the upper paper layer and the release sheet layer of the laminated sheet when they were tried to be separated by hand was determined by the following criteria.

good: easily separated by hand.

bad: the upper paper layer and the release sheet layer were not easily separated from each other even by rubbing end faces of the sheets with fingers.

Evaluation of Dissipating Formaldehyde

A test piece was prepared by cutting the laminated sheet obtained in each of Examples and Comparative Examples into a size of 200 mm×200 mm. The test piece was put into a Tedlar bag of 5 L in volume, and was hermetically sealed up therein by degassing from the bag. Next, the bag was charged with 2 L of air, and was left to stand still in a constant temperature oven that was set at 23° C. in temperature at 50% in relative humidity for 6 hours, and thereafter the concentration of formaldehyde in the bag was measured with a gas detector tube (No. 91L manufactured by Gastec Corporation). Whether to be good or bad was determined by the following criteria.

good: the concentration of formaldehyde was no more than 0.2 ppm.

bad: the concentration of formaldehyde was beyond 0.2 ppm.

TABLE 5

| | Components | | | Thickness (μm) | | | Tensile elastic modulus | | | | | Rate of tensile elastic moduli | | Peels strength (Nm) | | Presence or not of loosing separation | Manual releas-ability | Evaluation of dissipating formalde-hyde |
|---|---|---|---|---|---|---|---|---|---|---|---|---|---|---|---|---|---|---|
| | | | | | | | Upper paper layer (Mpa) | | Release sheet layer (Mpa) | | | | | | | | | |
| | Synthetic paper | Adsorbing layer | Release sheet | Laminating face of release sheet | Synthe-tic paper | Adsorb-ing layer | Release sheet | MD direction | TD direction | MD direction | TD direction | MD direction | TD direction | MD direction | TD direction | | | |
| Ex. 1 | Production Ex. 1 | Resin composition J | CPP | Gloss | 110 | 250 | 50 | 490 | 800 | 740 | 740 | 0.66 | 1.1 | 7.4 | 6.9 | None | Good | Good |
| Ex. 2 | Production Ex. 2 | Resin composition J | CPP | Gloss | 80 | 85 | 50 | 660 | 1140 | 740 | 740 | 0.89 | 1.5 | 6.2 | 6.3 | None | Good | Good |
| Ex. 3 | Production Ex. 3 | Resin composition J | CPP | Gloss | 60 | 85 | 50 | 610 | 940 | 740 | 740 | 0.82 | 1.3 | 6.0 | 6.1 | None | Good | Good |
| Ex. 4 | Production Ex. 4 | Resin composition J | CPP | Gloss | 75 | 85 | 50 | 1020 | 1480 | 740 | 740 | 1.4 | 2.0 | 8.4 | 8.5 | None | Good | Good |
| Ex. 5 | Production Ex. 5 | Resin composition J | CPP | Gloss | 70 | 85 | 50 | 570 | 930 | 740 | 740 | 0.77 | 1.3 | 5.0 | 5.1 | None | Good | Good |
| Ex. 6 | Production Ex. 6 | Resin composition J | CPP | Gloss | 80 | 85 | 50 | 320 | 1760 | 740 | 740 | 0.43 | 0.43 | 5.4 | 5.5 | None | Good | Good |
| Ex. 7 | Production Ex. 1 | Resin composition J | CPP | Gloss | 45 | 85 | 50 | 1590 | 320 | 740 | 740 | 2.1 | 2.4 | 28.1 | 27.5 | None | Good | Good |
| Ex. 8 | Production Ex. 1 | Resin composition K | CPP | Gloss | 110 | 250 | 50 | 490 | 800 | 740 | 740 | 0.66 | 1.1 | 10.9 | 10.1 | None | Good | Good |
| Ex. 9 | Production Ex. 1 | Resin composition L | CPP | Gloss | 110 | 250 | 50 | 490 | 800 | 740 | 740 | 0.66 | 1.1 | 7.8 | 6.3 | None | Good | Good |
| Ex. 10 | Production Ex. 1 | Resin composition J | CPE | Gloss | 110 | 250 | 30 | 490 | 800 | 360 | 270 | 1.4 | 3.0 | 11.8 | 11.1 | None | Good | Good |
| Ex. 11 | Production Ex. 1 | Resin composition J | OPP | Gloss | 110 | 250 | 60 | 490 | 800 | 2040 | 4000 | 0.24 | 0.20 | 18.4 | 17.6 | None | Good | Good |
| Ex. 12 | Production Ex. 1 | Resin composition J | CPE | Gloss | 80 | 85 | 30 | 660 | 1140 | 360 | 270 | 1.8 | 4.2 | 5.6 | 5.5 | None | Good | Good |
| Ex. 13 | Production Ex. 2 | Resin composition J | CPP | Gloss | 80 | 85 | 60 | 660 | 1140 | 2040 | 4000 | 0.32 | 0.29 | 12.3 | 12.3 | None | Good | Good |
| Comp. Ex 1 | Production Ex. 1 | Resin composition M | CPP | Gloss | 110 | 250 | 50 | 490 | 800 | 740 | 740 | 0.66 | 1.1 | 2.6 | 2.6 | Present | Good | Bad |
| Comp. Ex 2 | Production Ex. 1 | Resin composition J | PET1 | Gloss | 110 | 250 | 50 | 490 | 800 | 4000 | 5000 | 0.12 | 0.16 | 41.2 | 38.5 | None | Bad | Good |
| Comp. Ex 3 | Production Ex. 1 | Resin composition J | PET2 | Treated with silicone | 110 | 250 | 50 | 490 | 800 | 4250 | 5830 | 0.12 | 1.4 | 3.5 | 3.4 | Present | Good | Good |
| Comp. Ex 4 | Production Ex. 1 | Resin composition J | Paper separator | Treated with silicone | 110 | 250 | 80 | 490 | 800 | 5700 | 2350 | 0.086 | 0.34 | 2.1 | 2.0 | Present | Good | Good |
| Comp. Ex 5 | Production Ex. 2 | Resin composition J | PET2 | Treated with silicone | 80 | 85 | 50 | 660 | 1140 | 4250 | 5830 | 0.16 | 0.20 | 3.1 | 3.1 | Present | Good | Good |
| Comp. Ex 6 | Production Ex. 2 | Resin composition J | Paper separator | Treated with silicone | 80 | 85 | 80 | 660 | 1140 | 5700 | 2350 | 0.12 | 0.49 | 1.6 | 1.7 | Present | Good | Good |
| Comp. Ex 7 | Production Ex. 1 | Resin composition J | CPP | Mat | 110 | 250 | 50 | 490 | 800 | 740 | 740 | 0.66 | 1.1 | 0.5 | 0.5 | Present | Good | Good |
| Comp. Ex 8 | Production Ex. 1 | Resin composition J | CPE | Mat | 110 | 250 | 30 | 490 | 800 | 360 | 270 | 1.4 | 3.0 | 0.5 | 1.0 | Present | Good | Good |
| Comp. Ex 9 | Production Ex. 1 | Resin composition M | CPE | Gloss | 110 | 250 | 30 | 490 | 800 | 360 | 270 | 1.4 | 3.0 | 2.8 | 3.7 | Present | Good | Bad |
| Comp. Ex. 10 | Production Ex. 1 | Resin composition M | CPP | Gloss | 110 | 250 | 60 | 490 | 800 | 2040 | 4000 | 0.24 | 0.20 | 4.7 | 5.1 | None | Good | Bad |
| Comp. Ex. 11 | Production Ex. 1 | Resin composition M | CPP | Mat | 110 | 250 | 30 | 490 | 800 | 740 | 740 | 0.66 | 1.1 | 0.0 | 0.0 | Present | Good | Bad |

As shown in Table 4, all the laminated sheets according to Examples 1 to 13 were as follows: their rates of the tensile elastic moduli were within proper ranges; they had proper release forces; they did not loose to be separated in printing; they had easy manual releasability; and the amounts of dissipating formaldehyde from them were small. In contrast, the amounts of dissipating formaldehyde from the laminated sheets according to Comparative Examples 1 and 9 to 11 which used a melamine crosslinking agent were large. Further, the laminated sheets according to Comparative Examples 1 and 9, and that according to Comparative Example 11 which used the release sheet, the laminating face of which had high arithmetic mean roughness Ra, did not have proper release forces, and loosed to be separated in printing. The laminated sheet according to Comparative Example 2 which used the release sheet made of polyethylene terephthalate did not have a proper release force, or easy releasability by hand. The laminated sheets according to Comparative Examples 3 to 6 which used the release sheets whose laminating faces were treated with silicone, and the laminated sheets according to Comparative Examples 7 and 8 which used the release sheets whose laminating faces had high arithmetic mean roughness Ra did not have proper release forces, and loose to be separated in printing. The laminated sheet according to Comparative Example 4 had the rate of the tensile elastic moduli in the MD direction lower than a proper range due to the difference between the synthetic paper and a paper separator in tensile elastic modulus, and easily loosed to be separated in printing.

The invention claimed is:

1. A laminated sheet comprising an upper paper layer and a release sheet layer, the upper paper layer including synthetic paper and an adsorbing layer, the synthetic paper, the adsorbing layer and the release sheet layer, in order, being laminated, wherein
the adsorbing layer is a foam sheet of a resin composition, the resin composition containing crosslinking resultant of 100 parts by mass of a (meth)acrylic acid ester copolymer resin and 1 to 20 parts by mass of a carbodiimide crosslinking agent, the (meth)acrylic acid ester copolymer resin having a N-methylol group, a glass transition temperature of the (meth)acrylic acid ester copolymer resin being no more than $-10°$ C.,
the release sheet layer consists of a thermoplastic resin sheet,
a rate of tensile elastic moduli is 0.1 to 10, the rate being calculated from a tensile elastic modulus of the upper paper layer and a tensile elastic modulus of the release sheet layer, the tensile elastic moduli being measured based on JIS K7161-1: 2014, and a peel strength of the adsorbing layer and the release sheet layer is 5 to 30 N/m, the peel strength being measured based on JIS K6854-2: 1999, and
arithmetic mean roughness Ra of a surface of the release sheet layer is 0.01 to 1 µm, the surface being in contact with the adsorbing layer, the arithmetic mean roughness Ra being specified in JIS B0601: 2001.

2. The laminated sheet according to claim 1, wherein
the release sheet layer consists of a thermoplastic resin sheet whose surface is not treated with a release agent containing a silicone resin.

3. The laminated sheet according to claim 1, wherein
the synthetic paper is a porous sheet containing a thermoplastic resin, a whole porosity of the porous sheet being 5 to 50%.

4. A method for producing the laminated sheet according to claim 1, the method comprising:
preparing the synthetic paper;
preparing the release sheet layer that contains a thermoplastic resin, arithmetic mean roughness Ra of at least one surface of the release sheet layer being 0.01 to 1 µm, the arithmetic mean roughness Ra being specified in JIS B0601: 2001;
making a resin composition for the adsorbing layer, the resin composition containing 100 parts by mass of a (meth)acrylic acid ester copolymer resin, and 1 to 20 parts by mass of a carbodiimide crosslinking agent, the (meth)acrylic acid ester copolymer resin having a N-methylol group, a glass transition temperature of the (meth)acrylic acid ester copolymer resin being no more than $-10°$ C.;
foaming the resin composition for the adsorbing layer to obtain foam;
shaping the foam into a sheet on the synthetic paper, thereafter crosslinking the (meth)acrylic acid ester copolymer resin to form the adsorbing layer, and thereby laminating the synthetic paper and the adsorbing layer; and
laminating the release sheet layer onto the adsorbing layer so that a surface of the release sheet layer is in contact with the adsorbing layer, arithmetic mean roughness Ra of the surface being 0.01 to 1 µm.

5. The method according to claim 4, wherein
the synthetic paper is a porous sheet containing a thermoplastic resin, the porous sheet being a sheet that includes a porous layer whose whole porosity is 5 to 50%.

* * * * *